United States Patent
Gates et al.

(10) Patent No.: US 10,598,757 B2
(45) Date of Patent: Mar. 24, 2020

(54) SYSTEMS AND METHODS FOR IMPROVING THE PERFORMANCE OF A TIMING-BASED RADIO POSITIONING NETWORK USING ESTIMATED RANGE BIASES

(71) Applicant: NextNav, LLC, Sunnyvale, CA (US)

(72) Inventors: Christian Gates, Vienna, VA (US); Arun Raghupathy, Bangalore (IN)

(73) Assignee: NextNav, LLC, Sunnyvale, CA (US)

(*) Notice: Subject to any disclaimer, the term of this patent is extended or adjusted under 35 U.S.C. 154(b) by 375 days.

(21) Appl. No.: 15/481,122

(22) Filed: Apr. 6, 2017

(65) Prior Publication Data

US 2017/0212211 A1 Jul. 27, 2017

Related U.S. Application Data

(63) Continuation-in-part of application No. 14/207,400, filed on Mar. 12, 2014, now Pat. No. 9,933,526.

(60) Provisional application No. 61/789,951, filed on Mar. 15, 2013.

(51) Int. Cl.
*G01S 5/02* (2010.01)
*G01S 5/14* (2006.01)

(52) U.S. Cl.
CPC .......... *G01S 5/0215* (2013.01); *G01S 5/0252* (2013.01); *G01S 5/0273* (2013.01); *G01S 5/14* (2013.01)

(58) Field of Classification Search
CPC . G01S 5/00; G01S 5/0252; G01S 5/02; G01S 5/021; G01S 5/12; G01S 5/14; G01S 5/145; G01S 5/06; G01S 5/221; G01S 5/10; G01S 5/0215; G01S 5/0273; H04W 64/00; H04W 64/03; H04W 64/06; H04W 40/20; H04W 40/244
See application file for complete search history.

(56) References Cited

U.S. PATENT DOCUMENTS

| | | | | |
|---|---|---|---|---|
| 6,021,330 | A * | 2/2000 | Vannucci | G01S 5/0252 342/457 |
| 8,106,828 | B1 * | 1/2012 | Do | G01S 5/0252 342/451 |
| 2004/0166877 | A1 * | 8/2004 | Spain, Jr. | G01S 5/0252 455/456.1 |
| 2004/0189521 | A1 * | 9/2004 | Smith | G01S 5/0252 342/387 |
| 2005/0078033 | A1 * | 4/2005 | Tamaki | G01S 5/0252 342/463 |

(Continued)

OTHER PUBLICATIONS

Gates et al., U.S. Appl. No. 14/207,400, filed Mar. 12, 2014, 2014-0266910, Sep. 18, 2014.

(Continued)

*Primary Examiner* — Bernarr E Gregory
*Assistant Examiner* — Fred H Mull
(74) *Attorney, Agent, or Firm* — Kyle Pendergrass

(57) ABSTRACT

Estimating range bias in a timing-based radio positioning network. Systems and methods estimate range bias, and use the estimated bias to adjust an estimated range measurement for use in estimating a position of a receiver. Estimated range bias may be based on surveyed range errors associated with locations near the position of the receiver, or may alternatively be based on comparisons of different range measurements.

32 Claims, 12 Drawing Sheets

(56) References Cited

U.S. PATENT DOCUMENTS

| | | | | |
|---|---|---|---|---|
| 2006/0095348 A1* | 5/2006 | Jones | ............... | G01S 5/02 |
| | | | | 705/29 |
| 2009/0258658 A1* | 10/2009 | Edge | ............... | G01S 5/0252 |
| | | | | 455/456.3 |
| 2011/0188389 A1* | 8/2011 | Hedley | ............... | G01S 5/0215 |
| | | | | 370/252 |
| 2012/0149390 A1* | 6/2012 | Gravely | ............... | G01S 5/14 |
| | | | | 455/456.1 |
| 2013/0260782 A1* | 10/2013 | Un | ............... | G01S 5/0252 |
| | | | | 455/456.1 |
| 2013/0271324 A1* | 10/2013 | Sendonaris | ............... | G01S 5/02 |
| | | | | 342/450 |
| 2015/0181381 A1* | 6/2015 | Prechner | ............... | G01S 5/0252 |
| | | | | 455/456.1 |

OTHER PUBLICATIONS

Gates et al., U.S. Appl. No. 14/207,458, filed Mar. 12, 2014, 2014-0266915, Sep. 18, 2014.

* cited by examiner $r'_1 + D > r'_2$ $r'_1 + D < r'_2$

US 10,598,757 B2

SYSTEMS AND METHODS FOR IMPROVING THE PERFORMANCE OF A TIMING-BASED RADIO POSITIONING NETWORK USING ESTIMATED RANGE BIASES

BACKGROUND

A fixed, timing-based radio positioning system may consist of a set of ranging transmitters (e.g., $Tx_1$ to $Tx_n$) such that a receiver capable of receiving such transmissions can estimate its position. The accuracy of a receiver's position estimate is negatively affected by multiple factors, including: resolution of the transmission signal; synchronization of the transmitters; presence of reflected signals, resulting in the over-estimation of a range between the receiver and a transmitter; uncertainty about the estimated velocity and range of the receiver with respect to any given transmitter due to noise, insufficient signal strength or other radio properties; and poor geometry among the transmitters relative to the receiver, which increases the uncertainty of the position determined using the range from a given transmitter set with poor angular separation among them.

The above characteristics result in a combination of fixed range error biases and fixed range uncertainty functions at any given estimated point within the real plane. That is, a building causing a reflection creates a fixed reflection. An error in synchronization between two transmitters is a fixed error between those two transmitters, within the stability of the synchronization system. Poor geometry or bandwidth-related resolution limits will result in position bias with a fixed histogram based on the geometric properties of the network. These biases are endogenous to the radio positioning system.

Accordingly, if biases can be detected, and the uncertainty of a given range estimate can be reduced, then the quality of position can be improved. With known locations of transmitters, the physical and geometric properties of the transmitter network could enable considerable improvements compared to techniques applied to networks where there is less information about the network. Further, knowledge about the biases detected may be propagated through an error-correction system due to the fixed nature of the radio positioning system and the fixed nature of the biases.

DETAILED DESCRIPTION

Various techniques for improving performance of a timing-based radio positioning system using assistance information are described below.

Actual Position

Figure 1A:
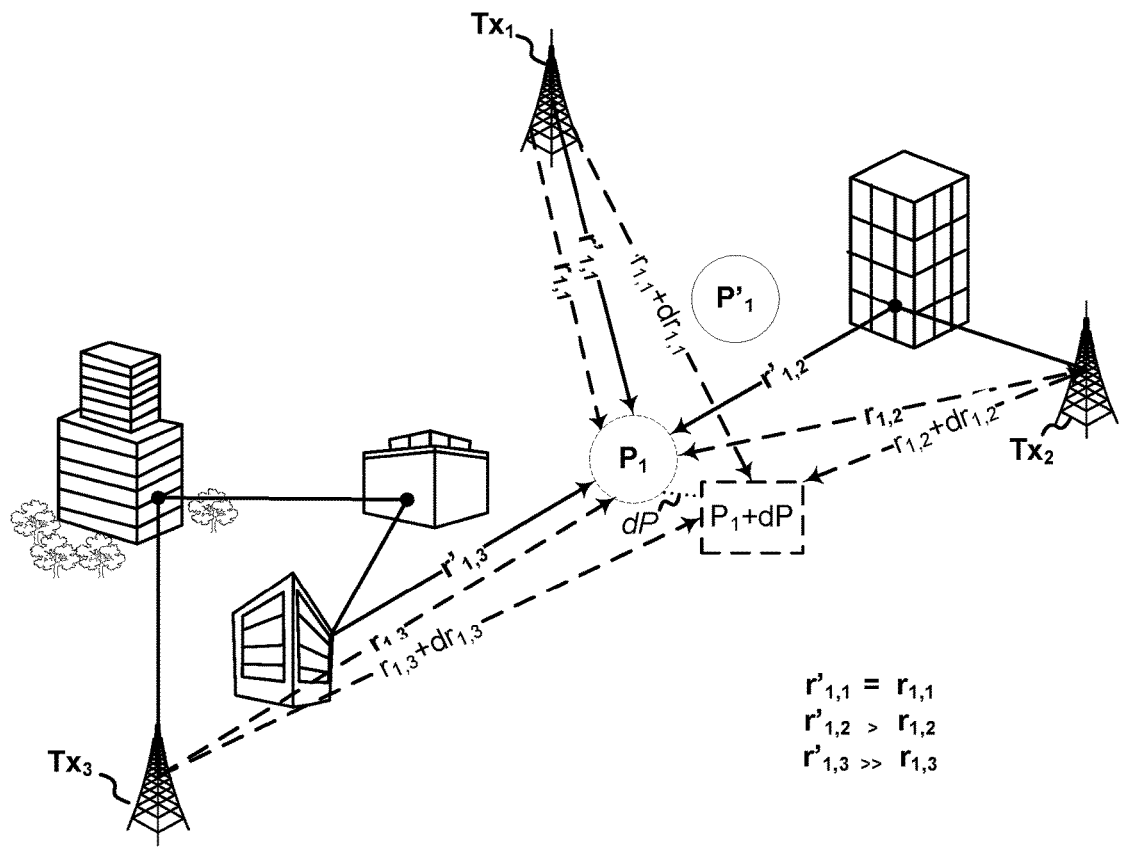
FIG. 1A depicts a positioning system where ranging signals that travel over particular distances are received by a receiver, and then used to estimate the position of the receiver.

Consider a given physical area with N ranging transmitters $Tx_1$ to $Tx_n$—e.g., transmitters $Tx_1$ to $Tx_3$ of FIG. 1A. A receiver located in that physical area of N ranging transmitters has a position, $P_1$. The range to $P_1$ from each of $Tx_N$ is $r_{1,N}$—e.g., in FIG. 1A, the range to $P_1$ from $Tx_1$ is $r_{1,1}$, the range to $P_1$ from $Tx_2$ is $r_{1,2}$ and the range to $P_1$ from $Tx_3$ is $r_{1,3}$. It should be observed that for any small displacement, dP, of the receiver from $P_1$ (e.g., to position $P_1+dP$ shown in FIG. 1A) the ranges from the various transmitters become $r_{1,1}+dr_{1,1}$, $r_{1,2}+dr_{1,2}$, and $r_{1,3}+dr_{1,3}$, and that the translation from $P_1$ to $P_1+dP$ is a smooth and continuous translation.

Measured Position

A fixed, timing-based radio positioning system allows an appropriately-equipped receiver to receive signals from multiple transmitters, and by computing the ranges to the various transmitters, estimate its position using the family of mathematical techniques collectively referred to as trilateration. As described previously, these range estimates, particularly in cluttered urban and indoor environments, can be subject to uncertainty and biases, and may not be an accurate estimate of actual ranges to the transmitters. Thus, the estimated position $P'_1$, as estimated using trilateration based on the estimated ranges $r'_{1,1}$, $r'_{1,2}$, ... $r'_{1,N}$ and the known transmitter locations $T_1$ through $T_N$, differs from the actual position $P_1$. The trilateration position estimate $P'_1$ can be written as:

$$P'_1 = f \begin{pmatrix} r'_{1,1} \\ r'_{1,2} \\ r'_{1,3} \\ \ldots \ldots \\ r'_{1,N} \end{pmatrix} \quad \text{(Equation 1)}$$

Figure 1B:
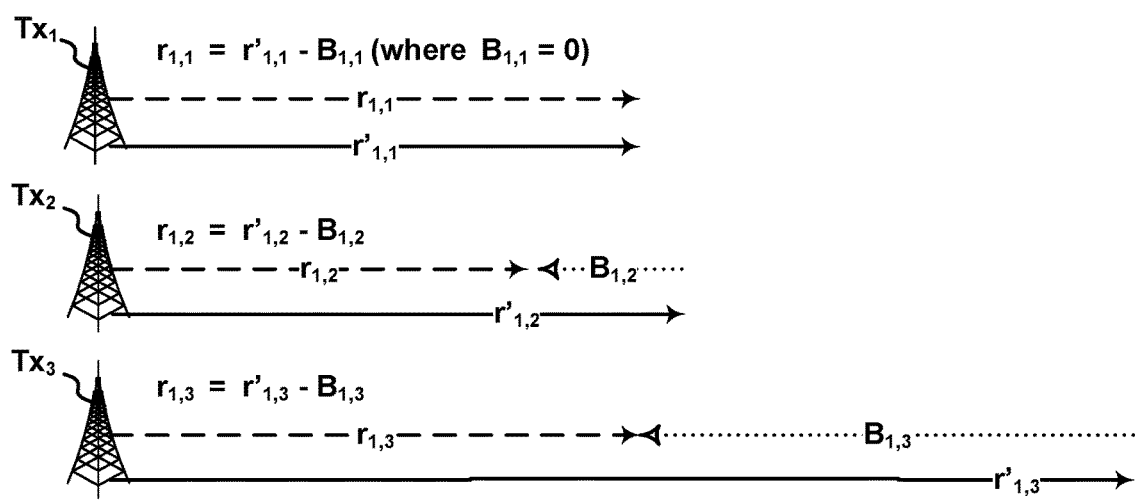
FIG. 1B illustrates differences between the distances traveled by the ranging signals from FIG. 1A and distances between respective transmitters and the receiver.

By way of example, FIG. 1A illustrates three estimated ranges (also referred to as "range measurements") ($r'_{1,1}$, $r'_{1,2}$, $r'_{1,3}$) that correspond to ranging signals received by the receiver at position $P_1$ from the three transmitters ($Tx_1$, $Tx_2$, $Tx_3$, respectively). For purposes of illustration, $r'_{1,1} = r_{1,1}$, $r'_{1,2} > r_{1,2}$, and $r'_{1,3} >> r_{1,3}$. For purposes of further illustration, the estimated position $P'_1$ of the receiver is shown, which is determined using the estimated ranges ($r'_{1,1}$, $r'_{12}$, $r'_{13}$), since the actual ranges ($r_{1,1}$, $r_{1,2}$, $r_{1,3}$) are not known. It is noted that the estimated position $P'_1$ is not equal to the actual position $P_1$, mainly because the estimated ranges ($r'_{1,1}$, $r'_{1,2}$, $r'_{1,3}$) are not always equal to the actual ranges ($r_{1,1}$, $r_{1,2}$, $r_{1,3}$). As illustrated in FIG. 1B, which pictorially compares each of the three estimated ranges ($r'_{1,1}$, $r'_{1,2}$, $r'_{1,3}$) to each of the three actual ranges ($r_{1,1}$, $r_{1,2}$, $r_{1,3}$), differences between the actual and estimated ranges may be represented by range biases $B_{1,1}$, $B_{1,2}$, $B_{1,3}$. Additional detail regarding range bias B is provided below.

Correcting Fixed Range Bias Based on Geometric System Properties

Because the sources of range bias are generally fixed (e.g., buildings), and the position of the transmitters is fixed, the mapping from P' to P can be characterized as a fixed term, B at any position $P_n$. If for every position estimate P' the exact bias term B was known, the actual position $P_n$ could be determined. That is, P=f(r'−B), and each individual range $r_n = r'_n - B_n$. Examples of $r_n = r'_n$ B for a position $P_1$ and transmitters n=1, 2 and 3 are shown in FIG. 1B as $r_{1,1} = r'_{1,1} - B_{1,1}$, $r_{1,2} = r'_{1,2} - B_{1,2}$, and $r_{1,3} = r'_{1,3} - B_{1,3}$.

$$P_n = f \begin{bmatrix} \begin{pmatrix} r'_{n,1} \\ r'_{n,2} \\ r'_{n,3} \\ \ldots \ldots \\ r'_{n,N} \end{pmatrix} - B_n \end{bmatrix} \quad \text{(Equation 2)}$$

$$B_n = \begin{pmatrix} b_{n,1} \\ b_{n,2} \\ b_{n,3} \\ \ldots \ldots \\ b_{n,N} \end{pmatrix} \quad \text{(Equation 3)}$$

Note that bias vector B has several useful properties, among them: each element of B must be greater than or equal to zero in a well-calibrated system for every position P; B is generally fixed over long time horizons; the translation from $B_1$ to any $B_n$ is neither smooth nor continuous (each element of B can differ by great amounts between any two points in the service area, even if they are close together); and the components of B, unlike the components of P, are independent of one another. It is noted that B could be less than zero ("early arrival") in a system with timing challenges or if there is uncertainty about the arrival of the signal, which may require database tuning.

While physically possible, it is often impractical to precisely measure B for every position P in the service area. Thus, a method to estimate B and propagate B through the correction system would be advantageous. It is, however, practical to precisely measure B at some number of locations within a given service area. Thus a receiver at surveyed location P, with estimated position P' now has a known bias B=r'−r. B, along with the reported P' or the reported r', could be stored at some remote server or at the receiver. In the future, P' or r' could then be reported by the receiver to the server to look up B. By subtracting B from r', the trilateration computation could be re-run and P could thus be accurately computed. More explicitly, given P' and the associated estimated ranges, $r'_1, r'_2 \ldots r'_N$, the actual ranges $r'_1 - b_1 = r_1$, $r'_2 - b_2 = r_2 \ldots r'_N - b_N = r_N$ could be computed, providing a basis to compute the actual position. Similarly, given a set of estimated ranges, $r'_1, r'_2, \ldots r'_N$, the actual ranges $r'_1 - b_1 = r_1$, $r'_2 - b_2 = r_2 \ldots r_N - b_N = r_N$ could be computed.

Now suppose there is a true position, $P_1$, and an estimate of that position, $P'_1$, with the known bias term $B_1$. Suppose also that there is a second position estimate, $P'_2$. Both estimates may be reported to a processor. Upon inspection, suppose that the individual range components of $P'_2$ are "close" (within some predefined margin) to the range components of $P'_1$. That is, $r'_{1,1}$ is close to $r'_{2,1}$, and $r'_{1,2}$ is close to $r'_{2,2}$ and so forth. Or, when inspected as a vector $r'_1$ is close to $r'_2$ in some sense (for example, in the norm-2 sense or in norm-1 sense). It is thus likely that $B_2$ is close to $B_1$ and $B_2$ can be set to $B_1$ as a first estimate.

For purposes of comparison, consider third position estimate $P'_3$ and fourth position estimate $P'_4$, as computed using trilateration. The following comparisons may be made between range measurements for $P'_3$ and range measurements of $P'_1$: $r'_{3,1} \sim r'_{1,1}$; $r'_{3,2} >> r'_{1,2}$; $r'_{3,3} \sim r'_{1,3}$; $\ldots$; $r'_{3,N} \sim r'_{1,N}$. The following comparisons may be made between range measurements for $P'_4$ and range measurements of $P'_1$: $r'_{4,1} \sim r'_{1,1}$; $r'_{4,2} << r'_{1,2}$; $r'_{4,3} \sim r'_{1,3}$; $\ldots$; $r'_{4,N} \sim r'_{1,N}$.

It is noted that "$\sim$" represents equal or nearly equal (e.g., within a threshold value of each other), "$>>$" represents much larger than (e.g., more than at least the threshold value), and "$<<$" represents much less than (e.g., less than at least the threshold value). Note that when comparing estimated ranges or pseudoranges or times-of-arrival (TOAs), it is assumed that the time bias nuisance parameter has been eliminated. For example, a maximum likelihood estimate of the time bias may be computed based on the transmission times of the transmitters, the TOA measurements at the receiver and the timing data associated with a hypothesized reference location. The measured TOA are then modified with this estimated bias, effectively changing them from estimated pseudoranges to estimated true ranges. True range estimate vectors can then be compared in a L1 or L2 sense or on an individual element basis. Alternatively, time differencing can be used relative to a reference beacon before the comparison is done.

In the case of $P'_3$, the range $r'_{3,2}$ is much longer than the range $r'_{1,2}$, but all of the other ranges are similar. The geometry of the network is such that this is not possible. We can then estimate $b'_{3,1}$, $b'_{3,2}$ $\ldots$ $d'_{3,N}$ directly as done for $B'_2$—but for $b'_{3,2}$ this will not work because $r'_{3,2}$ obviously has a much greater reflection profile compared to $r'_{1,2}$. One method to estimate $b'_{3,2}$ would be to set $b'_{3,2} = b'_{1,2} + (r'_{3,2} - r'_{1,2}) - \text{mean}\{r'_{3,n} - r'_{1,n} \text{ (for } n \neq 2)\}$. Another method would be to drop $r'_{3,2}$ from the computation of the position altogether and estimate its bias after performing the trilateration calculation using $B_1$ as the estimated bias for all of the other ranges.

$$\text{Thus, } B'_3 = \begin{pmatrix} b_{1,1} \\ b_{1,2} + C \\ b_{1,3} \\ \ldots \\ b_{1,N} \end{pmatrix}. \quad \text{(Equation 4)}$$

In the case of P'$_4$, the case is reversed. In this scenario, B'$_{1,n}$ can again be used as the initial bias estimate for B'$_{4,n}$ for every term except r'$_{4,2}$. In that case, based on the magnitude of the difference between the expected r'$_{4,2}$, either b'$_{4,2}$ should be set to zero or some other sensible value that is lower than the other biases (e.g. the value of b$_{1,2}$, minus a constant C as shown in Equation 5 below). The reason is that shorter ranges from otherwise apparently adjacent position estimates are typically more accurate—e.g., an unexpectedly short range implies the elimination of a reflection, and a path more closely related to the direct path from the transmitter to the receiver. Thus, $$B'_4 = \begin{pmatrix} b_{1,1} \\ 0 \text{ or } (b_{1,2} - C) \\ b_{1,3} \\ \ldots \\ b_{1,N} \end{pmatrix}.$$ (Equation 5)

By applying this logic to estimated positions P'$_n$ that are close to the "surveyed position" P'$_1$, in terms of estimated ranges, the fixed bias estimates can be "pushed" through the correction server, with improving estimates of bias through the collection of greater numbers of position estimates by receivers seeking to improve their position. Over time, additional range measurements and associated biases for particular surveyed positions can be added to the database, improving the ability of the system to propagate "good" bias estimates over the service area. These measurements may be based on actual surveyed points, or based upon "trusted" positioning references (e.g., well-known proximity sensors) that are combined with the system's standalone ranging estimates.

Note that the logic flow described above can be extended even to scenarios where an initial surveyed position is not known. Suppose that the bias for P'$_1$ above is not known, but that P'$_1$ and P'$_3$ have the same relationship, described by:

$$P'_3 = f \begin{pmatrix} r'_{3,1} \sim r'_{1,1} \\ r'_{3,2} \gg r'_{1,2} \\ r'_{3,3} \sim r'_{1,3} \\ \ldots \ldots \\ r'_{3,N} \sim r'_{1,N} \end{pmatrix}.$$ (Equation 6)

Also, assume that the confidence on P'$_1$ is higher than P'$_3$. In this case, by comparing r'$_1$ and r'$_3$, an initial bias estimate for P'$_3$ can be created by applying the fact that range biases are always "long". In this case, our initial estimate for the range bias B'$_3$ could be estimated as:

$$B'_3 = \begin{pmatrix} 0 \\ r'_{3,2} - r'_{1,2} + \text{average} (r'_{3,n} - r'_{1,n}, \forall n \neq 2) \\ 0 \\ \ldots \ldots \\ 0 \end{pmatrix}.$$ (Equation 7)

Alternatively, P'$_3$ can be re-computed by ignoring r'$_{3,2}$ (based on the inspection of P'$_1$) and then inferring r'$_{3,2}$ from the geometry of the system and from there b'$_{3,2}$. Thus, with no external measured biases, a set of bias estimates can be created based on the geometric properties of the network. This latter observation in particular is applicable in transitions from zones where the fixed bias errors are low to directly adjacent zones where the fixed bias errors are high from certain directions, and not from others. For example, if one is shielded from one transmitter, only the ranges from that transmitter will show abnormally large ranges compared to "clean" measurements from short actual distances away, observable based on the otherwise similar range estimates. In a real system, the actual position estimates for a large number of cases are likely to be over-specified, which should permit further exploitation of the principles described.

Using Surveyed Locations to Identify Bias

Figure 2A:
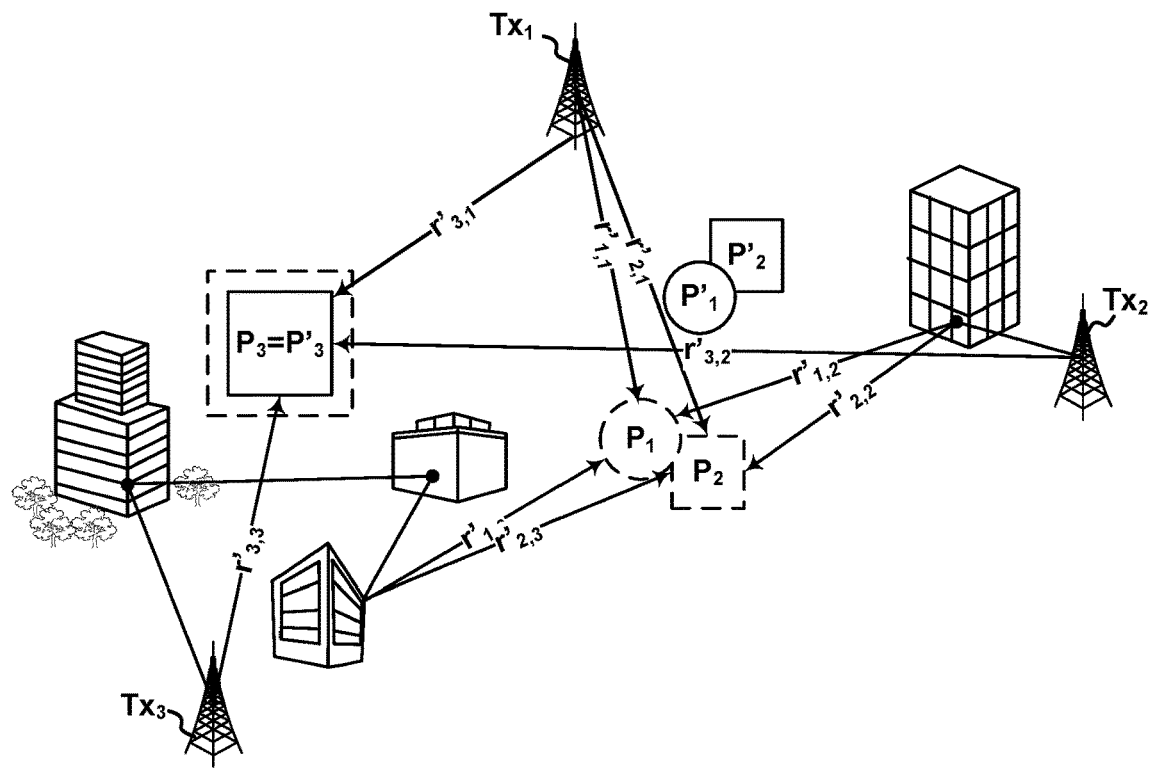
FIG. 2A depicts a positioning system where two positions are surveyed to determine biases corresponding to range measurements from ranging signals received at those positions.
Figure 2B:
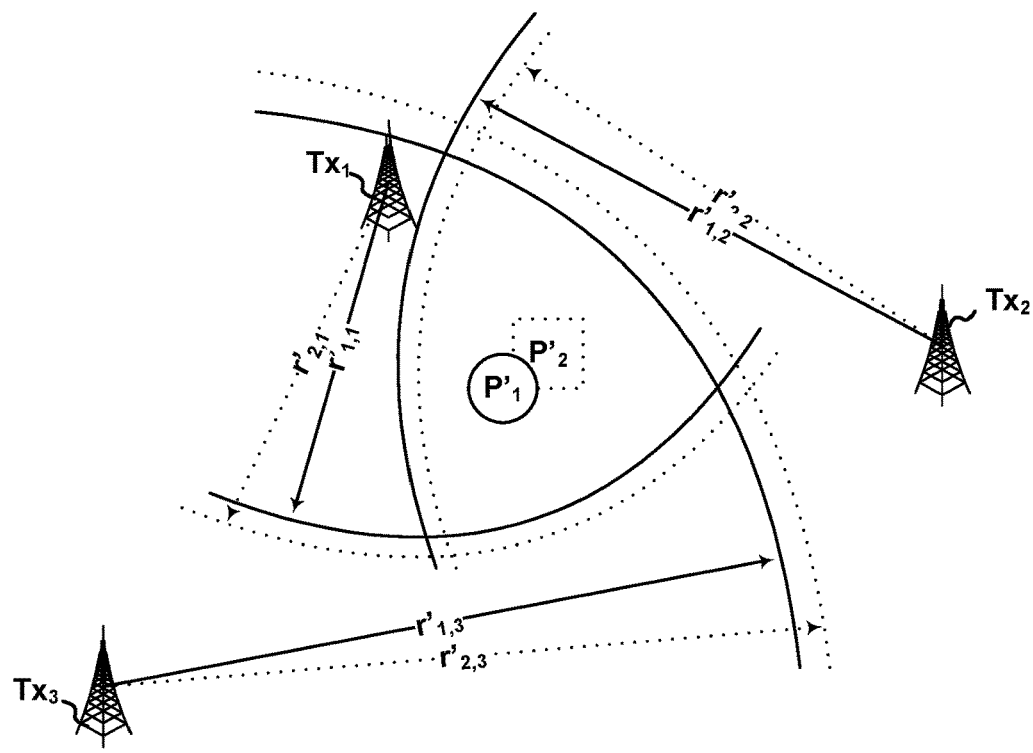
FIG. 2B illustrates geometric relationships between range measurements.

By way of illustration, FIG. 2A depicts an actual position P$_1$ of a receiver and two surveyed positions—P$_2$ and P$_3$. Estimated positions P'$_1$, P'$_2$ and P'$_3$ are also shown, which are determined using three estimated ranges for each of the positions: r'$_{1,1}$, r'$_{1,2}$, r'$_{1,3}$ for P'$_1$; r'$_{2,1}$, r'$_{2,2}$, r'$_{2,3}$ for P'$_2$; and r'$_{3,1}$, r'$_{3,2}$, r'$_{33}$ for P'$_3$. For reference, as readily understood by one of skill in the art, FIG. 2B illustrates how P'$_1$ and P'$_2$ are determined during trilateration processing that uses the range measurements r'$_{1,1}$, r'$_{1,2}$, r'$_{1,3}$ extracted from ranging signals received at P$_1$, and the range measurement r'$_{2,1}$, r'$_{2,2}$, r'$_{2,3}$ extracted from ranging signals received at P$_2$.

Figure 2C:
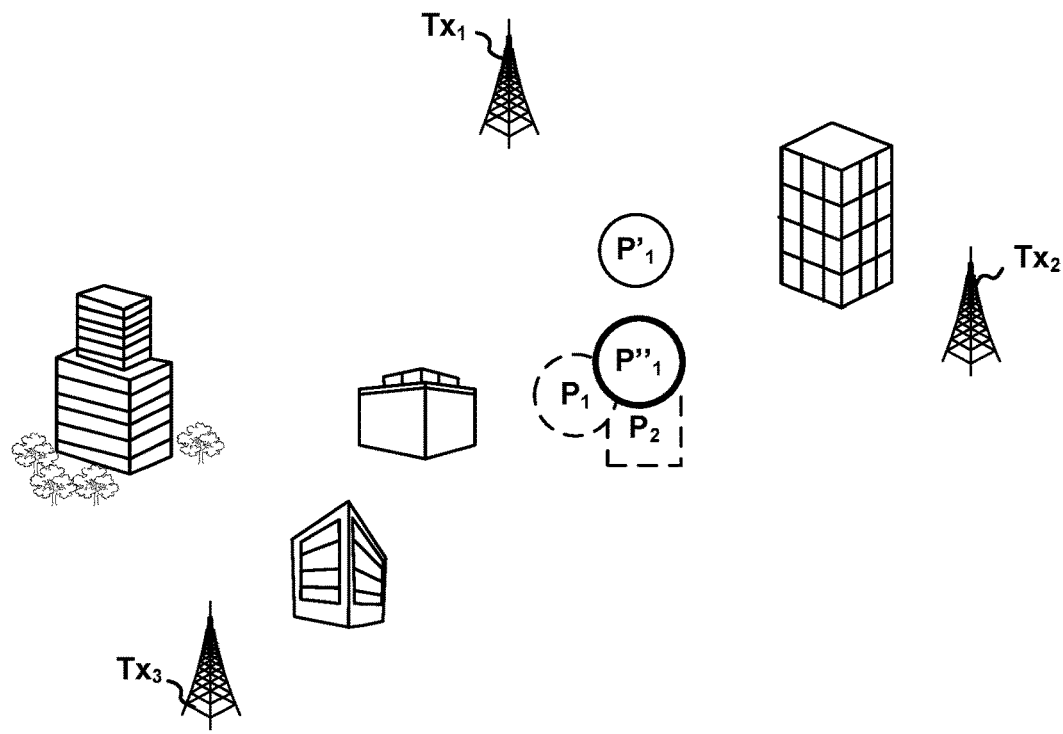
FIG. 2C illustrates a refined estimate of a receiver's position that is determined using biases of range measurements from ranging signals received at a surveyed position.

Attention is returned to FIG. 2A. As illustrated, since the locations of P$_1$ and P$_2$ are similar, the range measurements extracted from ranging signals at those positions are also similar. The similarity between the range measurements means that the estimated positions P'$_1$ and P'$_2$ are similar—e.g., because those estimated positions are computed using the similar range measurements. Thus, measured biases for range measurements corresponding to position P$_2$ are likely similar to unmeasured biases for the range measurements extracted from ranging signals received at position P$_1$. If the similar measured biases for range measurements corresponding to position P$_2$ are available, those measured biases may be used to adjust the range measurements extracted from ranging signals received at position P$_1$ to refine the initial estimated position P'$_1$ to an updated estimated position P'''$_1$ (as illustrated in FIG. 2C).

In FIG. 2A, the locations of P$_1$ and P$_3$ are not as similar to each other as the locations of P$_1$ and P$_2$. Consequently, measured biases for range measurements corresponding to position P$_3$ are probably not similar to unmeasured biases for range measurements extracted from ranging signals received at P$_1$. Thus, measured biases corresponding to P$_3$ would not be as reliable as measured biases corresponding to P$_2$ in terms of correcting for range error associated with the range measurements extracted from ranging signals received at position P$_1$.

Figure 3:
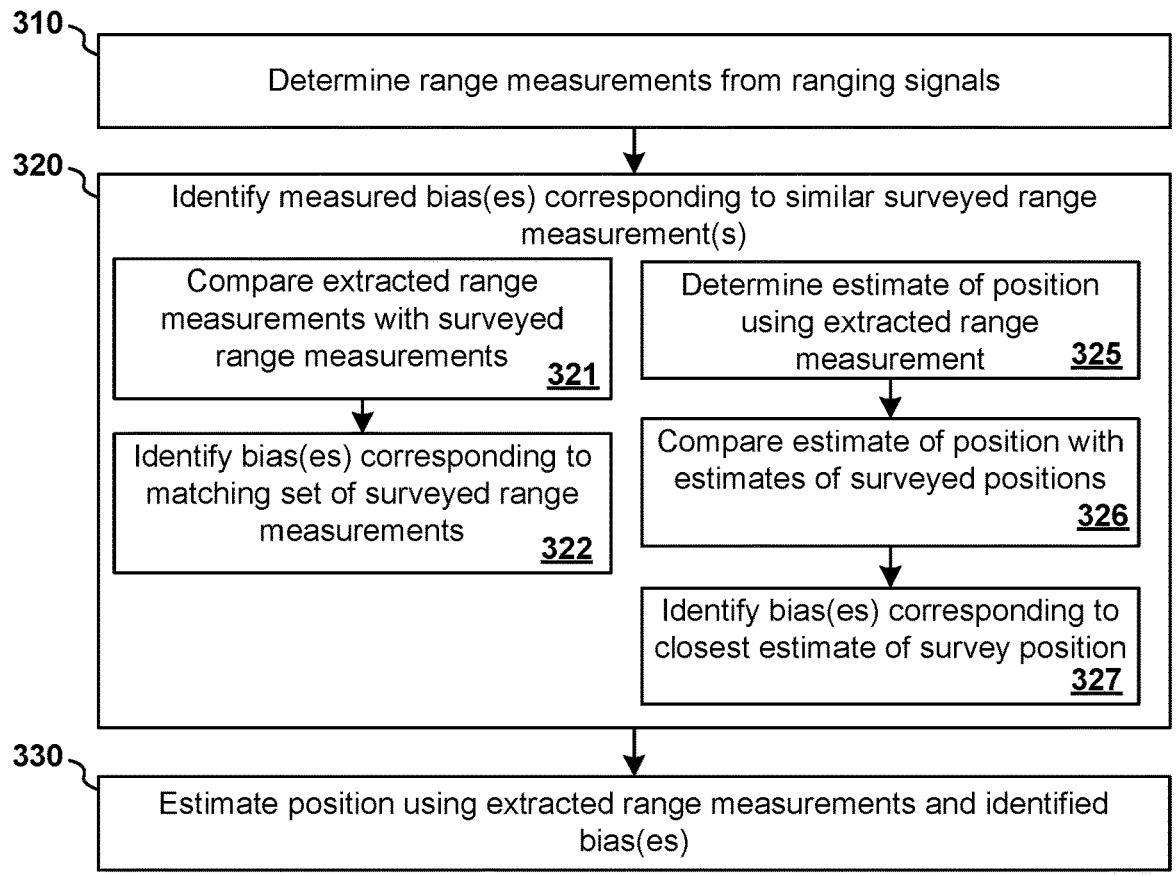
FIG. 3 illustrates a process for estimating a position of a receiver using information corresponding to biases associated with a surveyed position.

FIG. 3 illustrates different methods for identifying measured biases that are similar to unknown biases corresponding to range measurements extracted from ranging signals that are received at an unknown position of a receiver.

Initially, ranging signals are received at a receiver from a first set of transmitters, and range measurements are extracted from the ranging signals (310). Measured biases, which correspond to surveyed range measurements that are similar to the extracted range measurements, are identified (320). Once measured biases are identified, an estimate of the receiver's position is computed using the extracted range measurements and the measured biases (330). For example, measured bias may be identified for an extracted range measurement that is not within a threshold amount of distance from a corresponding surveyed range measurement. The measured biases may be used to adjust those extracted range measurements, and the adjusted range measurements may be used during trilateration.

There are various approaches for identifying measured biases (320). For example, sets of surveyed range measurements corresponding to the first set of transmitters may be accessed from a data source, and the extracted range measurements may be compared to corresponding range measurements from each set (321), where comparisons are made between range measurements that correspond to the same transmitter. The set that matches the extracted range measurements is identified based on one or more matching criterion, and measured biases that relate to the range measurements of that set are identified (322).

Matching criteria may vary across embodiments that follow this approach. For example, the matching criteria may specify that a minimum number of surveyed range measurements from a set must be within a threshold amount of distance from corresponding extracted range measurements. The threshold amount may be predefined—e.g., based on an acceptable measurement error tolerance, the spacing between surveyed locations, or some other factor. A set matches the extracted range measurements when the minimum number is reached.

Alternatively, the matching criteria may specify that the set with the most surveyed range measurements that are within the threshold amount of distance from corresponding extracted range measurements is the only matching set. Of course, other ways of matching surveyed range measurements to extracted range measurements are possible.

Another approach for identifying measured biases (320) uses an initial estimate of the receiver's position that is based on the extracted range measurements (325). The initial estimate of position is compared to various estimates of surveyed positions (326). The estimates of the surveyed positions are each based on surveyed range measurements that were extracted from surveyed ranging signals received at that surveyed position. An estimate of a surveyed position that is closest to the initial estimate is selected, and measured biases that relate to surveyed range measurements for that estimated survey position are identified (327).

Using Range Biases to Generate an Estimate of a Receiver's Position

FIG. 8 through FIG. 12 describe different processes for determining range biases, and using range biases to generate an estimate of a receiver's position. In the description below, the following notation is used: a position $P_M$ (where the M identifies a particular position—e.g., M=1 designates a first position); an estimated position $P'_M$ or $P''_M$ (where the M identifies an estimate of a particular position—e.g., M=1 designates an estimate of a first position); a transmitter $Tx_N$ (where the N identifies a particular transmitter—e.g., N=1 designates a first transmitter); transmitters $Tx_{N \to n}$ (represents n transmitters that include N through n transmitters); a ranging signal $S_{M,N}$ (where the $_{M,N}$ identifies a particular ranging signal received at a position $P_M$ from a transmitter $Tx_N$); ranging signals $S_{M,N \to n}$ (represents n ranging signals received at a position $P_M$ from n corresponding transmitters, which include N through n ranging signals); a range $R_{M,N}$ (where the $_{M,N}$ identifies a particular range between a position $P_M$ and a transmitter $Tx_N$); ranges $R_{M,N \to n}$ (represents n ranges between a position $P_M$ and n corresponding transmitters, which include N through n ranges); estimated ranges $R'_{M,N \to n}$ (represents n estimates of ranges between a position $P_M$ and n corresponding transmitters, which include N through n estimates of ranges); a range bias $B_{M,N}$ (where the $_{M,N}$ identifies a particular range bias corresponding to a particular range $R_{M,N}$, a particular estimated range $R'_{M,N}$ and/or a particular position $P_M$ and transmitter $Tx_N$); and range biases $B_{M,N \to n}$ (represents n range biases corresponding to n ranges, n estimated ranges, n transmitters and/or a position $P_M$).

Figure 8:
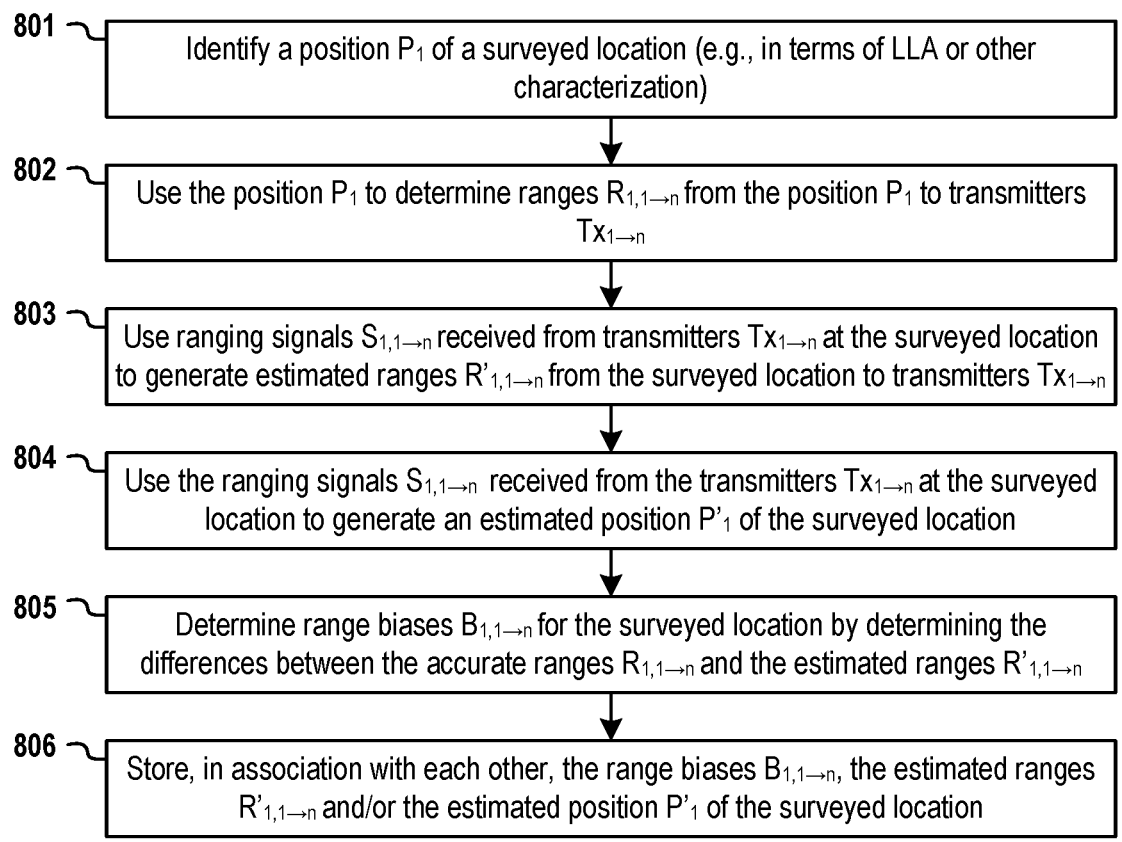
FIG. 8 illustrates a process for determining range biases for a surveyed location.

FIG. 8 illustrates a process for determining range biases for a surveyed location, which includes the following steps: identify a position $P_1$ of a surveyed location (e.g., in terms of LLA or other characterization) (step 801); use the position $P_1$ to determine ranges $R_{1,1 \to n}$ from the position $P_1$ to transmitters $Tx_{1 \to n}$ (step 802); use ranging signals $S_{1,1 \to n}$ received from transmitters $Tx_{1 \to n}$ at the surveyed location to generate estimated ranges $R'_{1,1 \to n}$ from the position $P_1$ of the surveyed location to corresponding transmitters $Tx_{1 \to n}$ (step 803); use the ranging signals $S_{1,1 \to n}$ received from the transmitters $Tx_{1 \to n}$ at the position $P_1$ of the surveyed location to generate an estimated position $P'_1$ of the surveyed location (step 804); determine range biases $B_{1,1 \to n}$ for the surveyed location by determining the differences between the accurate ranges $R_{1,1 \to n}$ and the estimated ranges $R'_{1,1 \to n}$ (step 805) (e.g., for each of N=1 to n, compute the range bias $B_{1,N}$ as the difference between $R_{1,N}$ and $R'_{1,N}$); and store, in association with each other, each of the range biases $B_{1,1 \to n}$ each of the estimated ranges $R'_{1,1 \to n}$ corresponding to respective range biases $B_{1,1 \to n}$ and/or the estimated position $P'_1$ of the surveyed location (step 806).

Figure 9A:
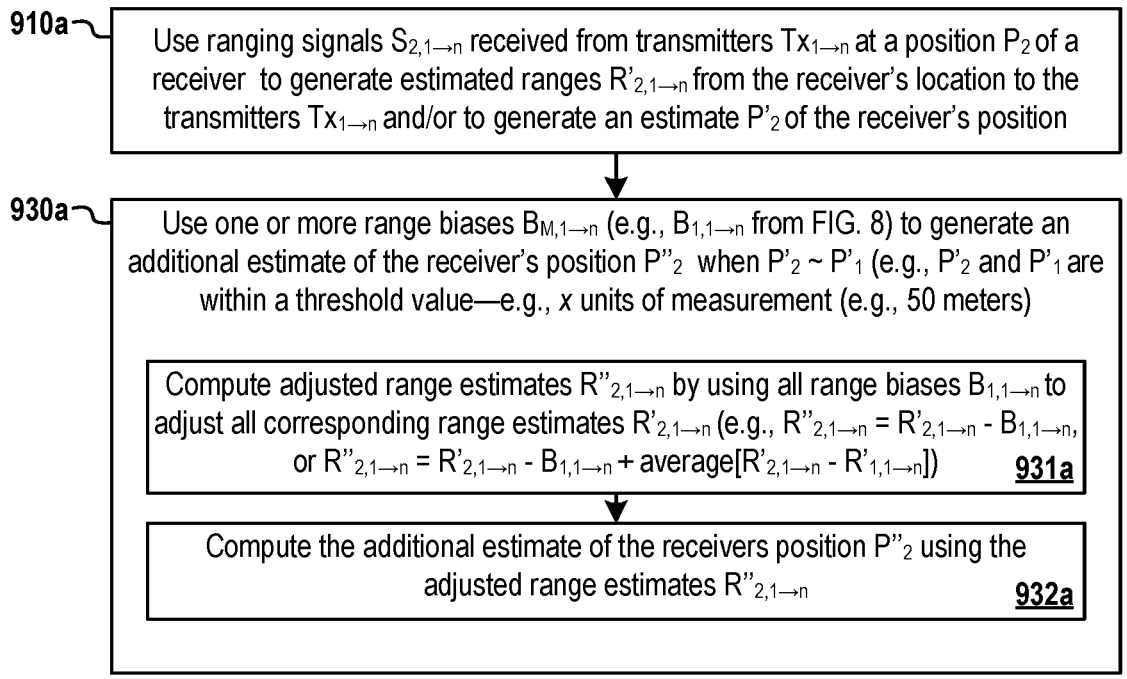
FIG. 9A-C each illustrate a process for using one or more range biases to generate an estimate of a receiver's position.
Figure 9B:
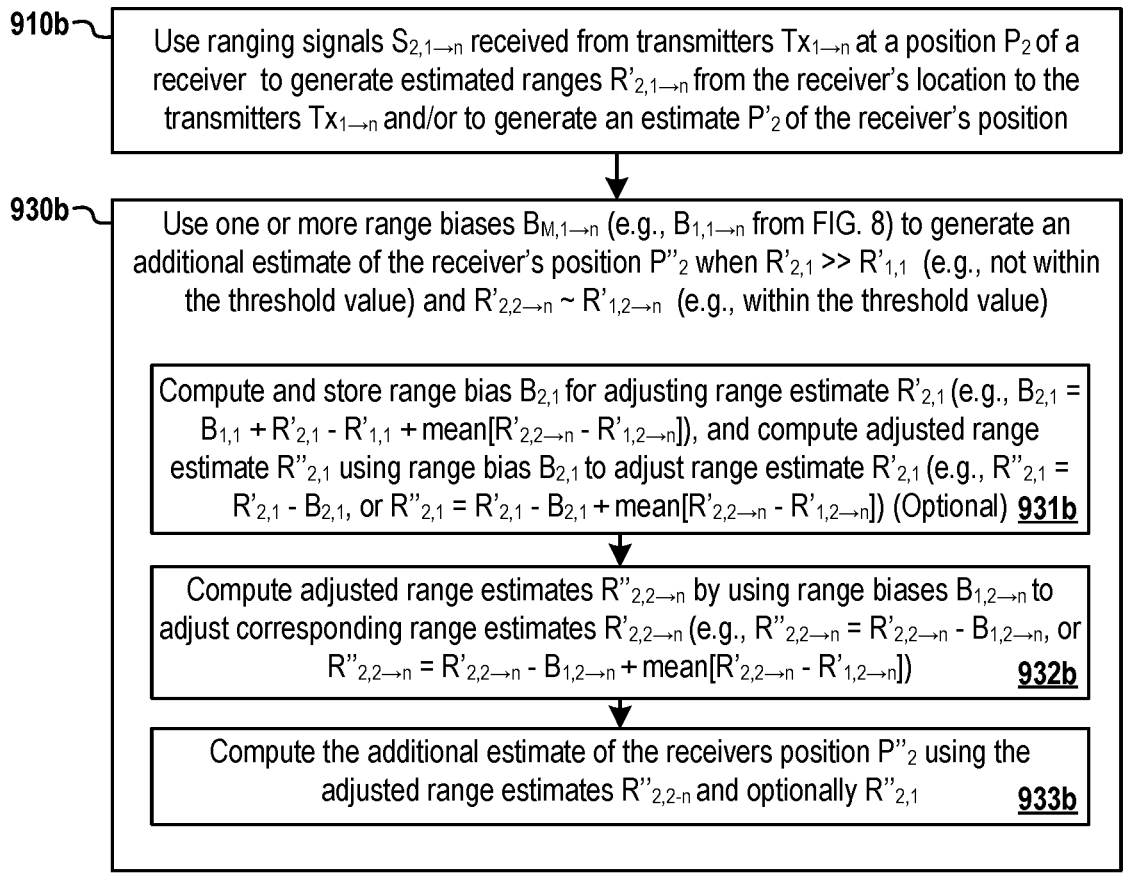
Figure 9C:
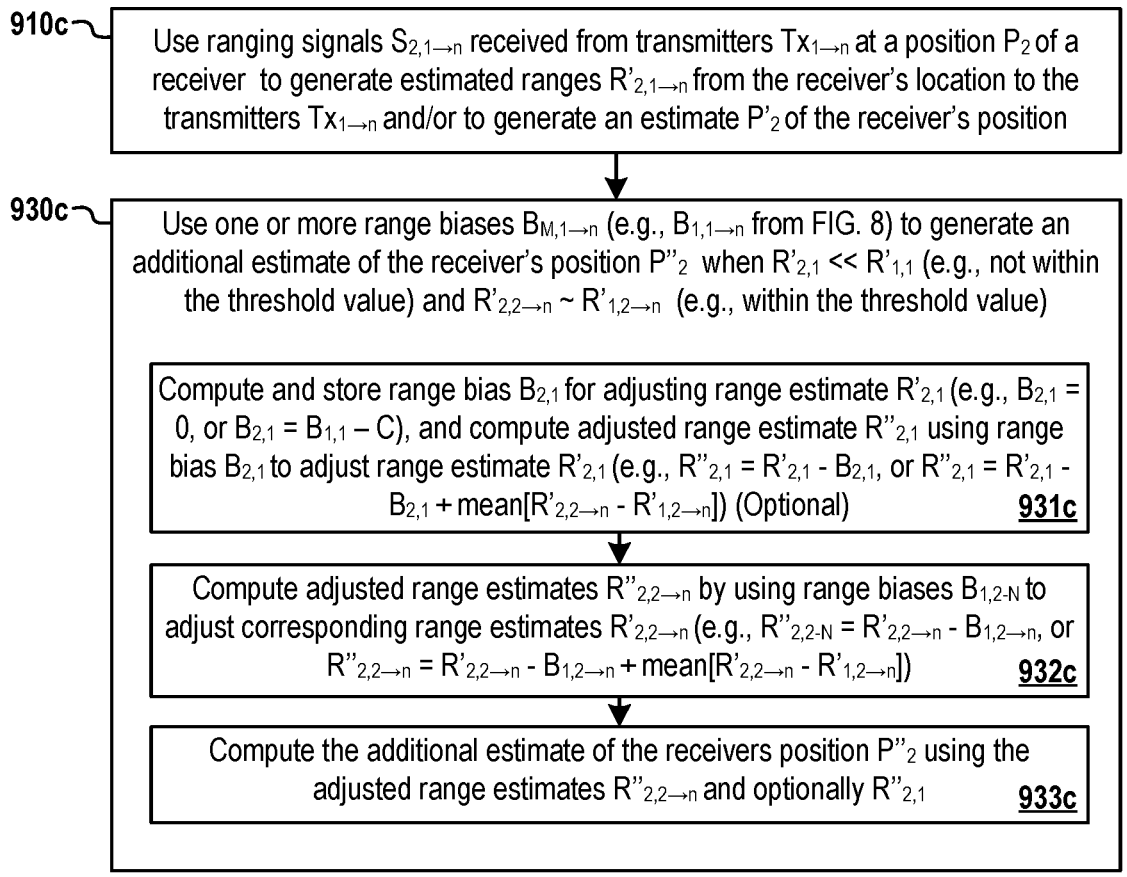

FIG. 9A-C each illustrate a process for using one or more range biases to generate an estimate of a receiver's position.

The process illustrated in FIG. 9A includes the following steps: use ranging signals $S_{2,1 \to n}$ received from corresponding transmitters $Tx_{1 \to n}$ at a position $P_2$ of a receiver to generate corresponding estimated ranges $12'_{2,1 \to n}$ from the receiver's location to the corresponding transmitters $Tx_{1 \to n}$ and/or to generate an estimate $P'_2$ of the receiver's position (step 910a); and use one or more corresponding range biases $B_{M,1 \to n}$ (e.g., $B_{1,1}$ from FIG. 8) to generate an additional estimate of the receiver's position $P''_2$ when $P'_2 \sim P'_1$ (e.g., $P'_2$ and $P'_1$ are within a threshold value—e.g., an amount of distance in x units of measurement (e.g., <10, <20, <30, <50, or another amount of meters) (step 930a). Step 930a may include the following sub-steps: compute adjusted range estimates $R''_{2,1 \to n}$ by using all corresponding range biases $B_{1,1 \to n}$ to adjust all corresponding range estimates $R'_{2,1 \to n}$ (sub-step 931a); and compute the additional estimate of the receivers position $P''_2$ using the adjusted range estimates $R''_{2,1 \to n}$ (sub-step 932a). In one embodiment, the adjusted range estimates $R''_{2,N=1 \to n}$ are computed by: computing, for each of N=1 to n, the difference between $R'_{2,N} - R'_{1,N}$; computing an average of the computed differences; and computing, for each of N=1 to n, $R''_{2,N} = R'_{2,N} - B_{1,N}$, or $R''_{2,N} = R'_{2,N} - B_{1,N}$+the computed average.

The process illustrated in FIG. 9B includes the following steps: use ranging signals $S_{2,1 \to n}$ received from corresponding transmitters $Tx_{1 \to n}$ at a position $P_2$ of a receiver to generate corresponding estimated ranges $R'_{2,1 \to n}$ from the receiver's location to the transmitters $Tx_{1 \to n}$ and/or to generate an estimate $P'_2$ of the receiver's position (step 910b); and use one or more range biases $B_{M,1 \to n}$ (e.g., $B_{1,1 \to n}$ from FIG. 8) to generate an additional estimate of the receiver's position $P''_2$ when $R'_{2,1} \gg R'L_1$ (e.g., when $R'_{2,1}$ is not within a threshold value of $R'_{1,1}$—e.g., a threshold value such as an amount of distance in x units of measurement (e.g., <10, <20, <30, <50, or another amount of meters), and $R'_{2,2\to n} \sim R'_{1,2\to n}$ (e.g., when each of $R'_{2,2\to n}$ is within the threshold value of the corresponding $R'_{1,2\to n}$) (step 930b). Step 930b may include the following sub-steps: compute and store range bias $B_{2,1}$ for adjusting range estimate $R'_{2,1}$, and compute adjusted range estimate $R''_{2,1}$ using range bias $B_{2,1}$ to adjust range estimate $R'_{2,1}$ (optional sub-step 931b); compute adjusted range estimates $R''_{2,2\to n}$ by using range biases $B_{1,2\to n}$ to adjust corresponding range estimates $R'_{2,2\to n}$ (sub-step 932b); and compute the additional estimate of the receivers position $P''_2$ using the adjusted range estimates $R''_{2,2-n}$ and optionally $R''_{2,1}$ (sub-step 933b).

In one embodiment, the range bias $B_{2,1}$ for adjusting range estimate $R'_{2,1}$ is computed by: computing, for each of N=2 to n, the difference between $R'_{2,N}-R'_{1,N}$; computing a mean of the computed differences; and computing $B_{2,1} = B_{1,1}+R'_{2,1}-R'_{1,1}+$the computed mean.

In one embodiment, the adjusted range estimate $R''_{2,1}$ is computed by: computing, for each of N=2 to n, the difference between $R'_{2,N}-R'_{1,N}$; computing a mean of the computed differences; and computing $R''_{2,1}=R'_{2,1}-B_{2,1}$, or $R''_{2,1}=R'_{2,1}-B_{2,1}+$the computed mean.

In one embodiment, the adjusted range estimates $R''_{2,2\to n}$ are computed by: computing, for each of N=2 to n, the difference between $R'_{2,N}-R'_{1,N}$; computing a mean of the computed differences; computing, for each of N=2 to n, $R''_{2,N}=R'_{2,N}-B_{1,N}$, or $R''_{2,N}=R'_{2,N}-B_{1,N}+$the computed mean.

The process illustrated in FIG. 9C includes the following steps: use ranging signals $S_{2,1\to n}$ received from corresponding transmitters $Tx_{1\to n}$ at a position $P_2$ of a receiver to generate corresponding estimated ranges $R'_{2,1\to n}$ from the receiver's location to the corresponding transmitters $Tx_{1\to n}$ and/or to generate an estimate $P'_2$ of the receiver's position (step 910c); and use one or more range biases $B_{M,1\to n}$ (e.g., $B_{1,1\to n}$ from FIG. 8) to generate an additional estimate of the receiver's position $P''_2$ when $R'_{2,1} \ll R'_{1,1}$ (e.g., when $R'_{1,1}$ is not within the threshold value of $R'_{2,1}$) and $R'_{2,2\to n} \sim R'_{1,2\to n}$ (e.g., when each of $R'_{1,2\to n}$ is within the threshold value of the corresponding $R'_{2,2\to n}$) (step 930c). Step 930c may include the following sub-steps: compute and store range bias $B_{2,1}$ for adjusting range estimate $R'_{2,1}$ (e.g., $B_{2,1}=0$, or $B_{2,1}=B_{1,1}-C$), and compute adjusted range estimate $R''_{2,1}$ using range bias $B_{2,1}$ to adjust range estimate $R'_{2,1}$ (optional sub-step 931c); compute adjusted range estimates $R''_{2,2\to n}$ by using range biases $B_{1,2\to n}$ to adjust corresponding range estimates $R'_{2,2\to n}$ (sub-step 932c); and compute the additional estimate of the receivers position $P''_2$ using the adjusted range estimates $R''_{2,2\to n}$ and optionally $R''_{2,1}$ (sub-step 933c).

In one embodiment, the adjusted range estimate $R''_{2,1}$ is computed by: computing, for each of N=2 to n, the difference between $R'_{2,N}-R'_{1,N}$; computing a mean of the computed differences; and computing $R''_{2,1}=R'_{2,1}-B_{2,1}$, or $R''_{2,1}=R'_{2,1}-B_{2,1}+$the computed mean.

In one embodiment, the adjusted range estimates $R''_{2,2\to n}$ are computed by: computing, for each of N=2 to n, the difference between $R'_{2,N}-R'_{1,N}$; computing a mean of the computed differences; computing, for each of N=2 to n, $R''_{2,N}=R'_{2,N}-B_{1,N}$, or $R''_{2,N}=R'_{2,N}-B_{1,N}+$the computed mean.

Figure 10:
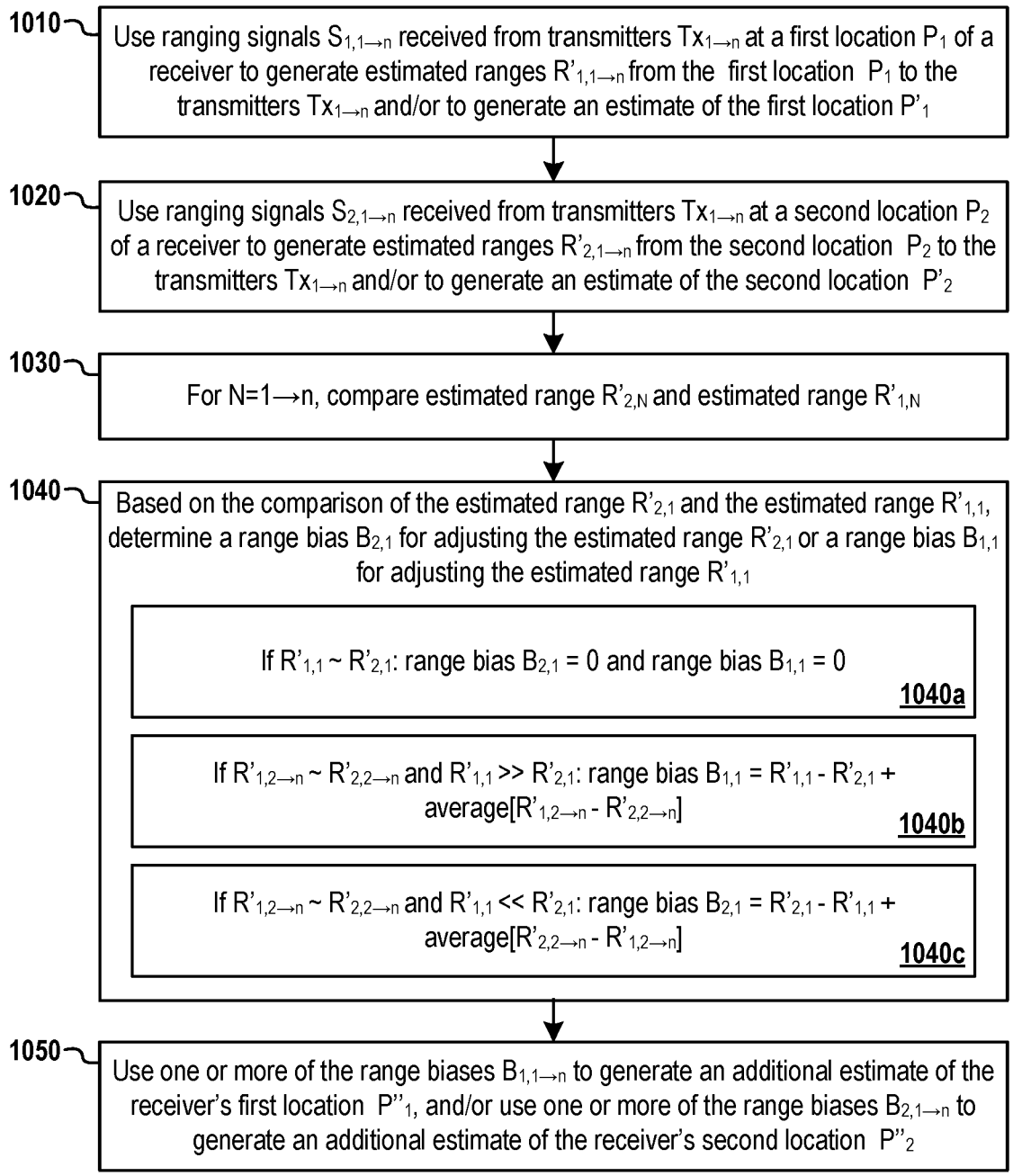
FIG. 10 illustrates a process for determining biases using estimated ranges for two locations of a receiver without using surveyed biases.

FIG. 10 illustrates a process for determining biases using estimated ranges for two locations of a receiver without using surveyed biases. The process illustrated in FIG. 10 includes the following steps: use ranging signals $S_{1,1\to n}$ received from corresponding transmitters $Tx_{1\to n}$ at a first location $P_1$ of a receiver to generate corresponding estimated ranges $R'_{1,1\to n}$ from the first location $P_1$ to the corresponding transmitters $Tx_{1\to n}$ and/or to generate an estimate of the first location $P'_1$ (step 1010); use ranging signals $S_{2,1\to n}$ received from the corresponding transmitters $Tx_{1\to n}$ at a second location $P_2$ of a receiver to generate corresponding estimated ranges $R'_{2,1\to n}$ from the second location $P_2$ to the corresponding transmitters $Tx_{1\to n}$ and/or to generate an estimate of the second location $P'_2$ (step 1020); for N=1 to n, compare estimated range $R'_{2,N}$ and estimated range $R'_{1,N}$ (step 1030); based on the comparison of the estimated range $R'_{2,1}$ and the estimated range $R'_{1,1}$, determine a range bias $B_{2,1}$ for adjusting the estimated range $R'_{2,1}$ or a range bias $B_{1,1}$ for adjusting the estimated range $R'_{1,1}$ (step 1040); and use one or more of the range biases $B_{1,1\to n}$ to generate an additional estimate of the receiver's first location $P'''_1$, and/or use one or more of the range biases $B_{2,1\to n}$ to generate an additional estimate of the receiver's second location $P'''_2$ (step 1050).

In one embodiment, step 1040 may include the following sub-step 1040a when $R'_{1,1} \sim R'_{2,1}$: range bias $B_{2,1}=0$ and range bias $B_{1,1}=0$.

In one embodiment, step 1040 may include the following sub-step 1040b when $R'_{1,2\to n} \sim R'_{2,2\to n}$ and $R'_{1,1} \gg R'_{2,1}$: compute, for each of N=2 to n, the difference between $R'_{1,N}-R'_{2,N}$; compute an average of the computed differences; compute the range bias $B_{2,1}=R'_{2,1}-R'_{1,1}+$the computed average.

In one embodiment, step 1040 may include the following sub-step 1040c when $R'_{1,2\to n} \sim R'_{2,2\to n}$ and $R'_{1,1} \ll R'_{2,1}$: compute, for each of N=2 to n, the difference between $R'_{1,N}-R'_{2,N}$; compute an average of the computed differences; compute the range bias $B_{1,1}=R'_{1,1}-R'_{2,1}+$the computed average.

Figure 11:
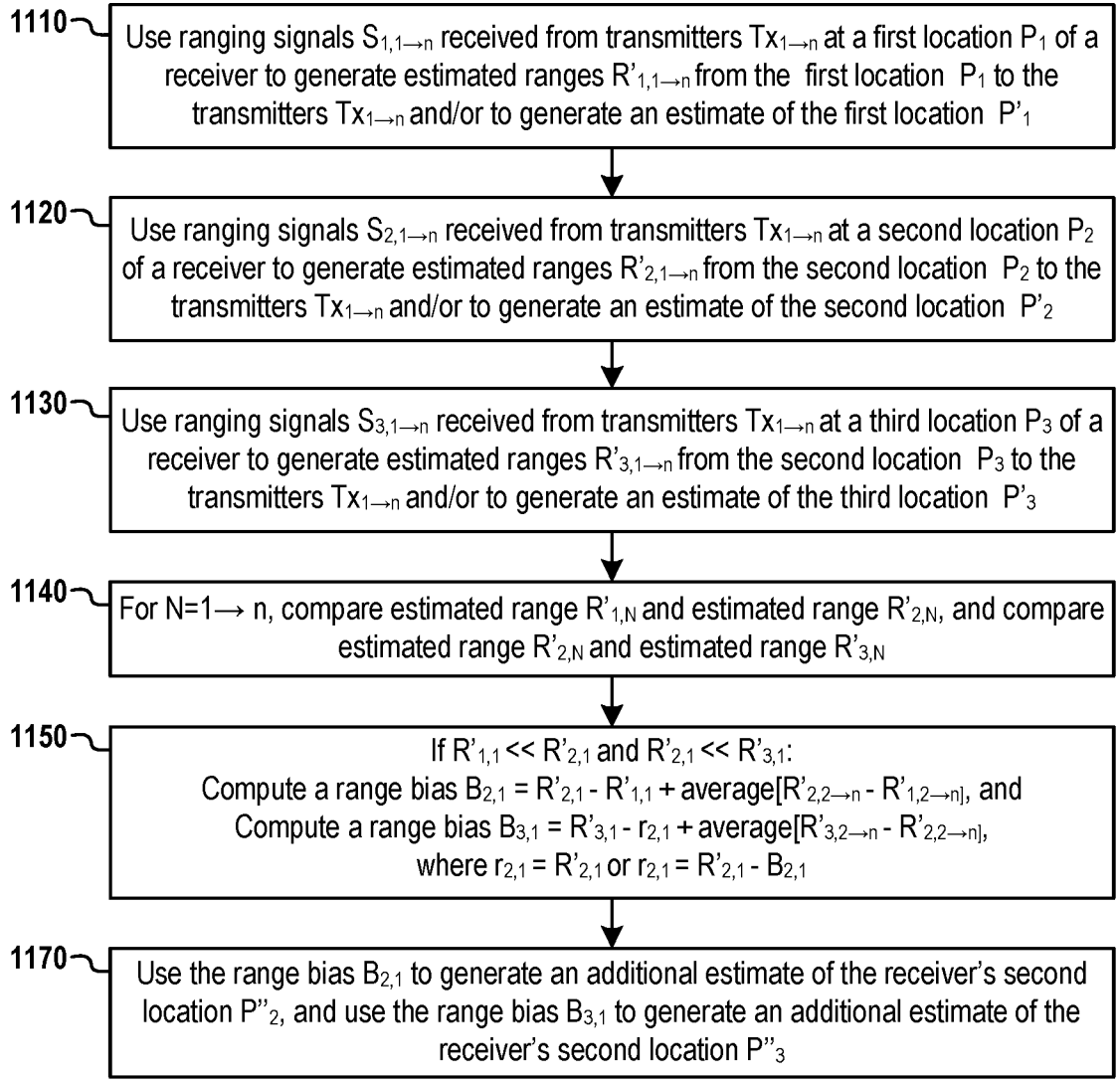
FIG. 11 illustrates a process for determining biases using estimated ranges for three locations of a receiver when a first relationship among corresponding range measurements for the different locations is detected.

FIG. 11 illustrates a process for determining biases using estimated ranges for three locations of a receiver when a first relationship among corresponding range measurements for the different locations is detected. The first relationship is defined when range measurements $R_{M,1}$ corresponding to signals received at positions $P_{M=1}$, $P_{M=2}$ and $P_{M=3}$ from a first transmitter $Tx_1$ have the following relationship $R'_{1,1} \ll R'_{2,1}$ and $R'_{2,1} \ll R'_{3,1}$. The process illustrated in FIG. 11 includes the following steps: use ranging signals $S_{1,1\to n}$ received from transmitters $Tx_{1\to n}$ at a first location $P_1$ of a receiver to generate estimated ranges $R'_{1,1\to n}$ from the first location $P_1$ to the transmitters $Tx_{1\to n}$ and/or to generate an estimate of the first location $P'_1$ (step 1110); use ranging signals $S_{2,1\to n}$ received from transmitters $Tx_{1\to n}$ at a second location $P_2$ of a receiver to generate estimated ranges $R'_{2,1\to n}$ from the second location $P_2$ to the transmitters $Tx_{1\to n}$ and/or to generate an estimate of the second location $P'_2$ (step 1120); use ranging signals $S_{3,1\to n}$ received from transmitters $Tx_{1\to n}$ at a third location $P_3$ of a receiver to generate estimated ranges $12'_{3,1\to n}$ from the second location $P_3$ to the transmitters $Tx_{1\to n}$ and/or to generate an estimate of the third location $P'_3$ (step 1130); for N=1 to n, compare estimated range $R'_{1,N}$ and estimated range $R'_{2,N}$, and compare estimated range $R'_{2,N}$ and estimated range $R'_{3,N}$ (step 1140); compute range biases $B_{2,1}$ and $B_{3,1}$ (step 1150); and use the range bias $B_{2,1}$ to generate an additional estimate of the receiver's second location $P'''_2$, and use the range bias $B_{3,1}$ to generate an additional estimate of the receiver's second location $P'''_3$ (step 1170).

In one embodiment, the range bias $B_{2,1}$ is computed by: computing, for each of N=2 to n, the difference between $R'_{2,N}-R'_{1,N}$, computing an average of the computed differences, and computing the range bias $B_{2,1}=R'_{2,1}-R'_{1,1}+$the computed average.

In one embodiment, the range bias $B_{3,1}$ is computed by: computing, for each of N=2 to n, the difference between $R'_{3,N} - R'_{2,N}$, computing an average of the computed differences, and computing the range bias $B_{3,1} = R'_{3,1} - r_{2,1} +$ the computed average, where $r_{2,1} = R'_{2,1}$ or $r_{2,1} = R''_{2,1} - B_{2,1}$.

If the relationship between estimated ranges $R'_{2,1}$ and $R'_{3,1}$ was $R'_{2,1} \sim R'_{3,1}$ instead of $R'_{2,1} << R'_{3,1}$, then $B_{3,1} = B_{2,1}$ in one embodiment. Alternatively, or $B_{3,1} = B_{2,1}$ minus an average of computed differences between $R'_{3,N} - R'_{2,N}$ for each of N=2 to n.

Figure 12:
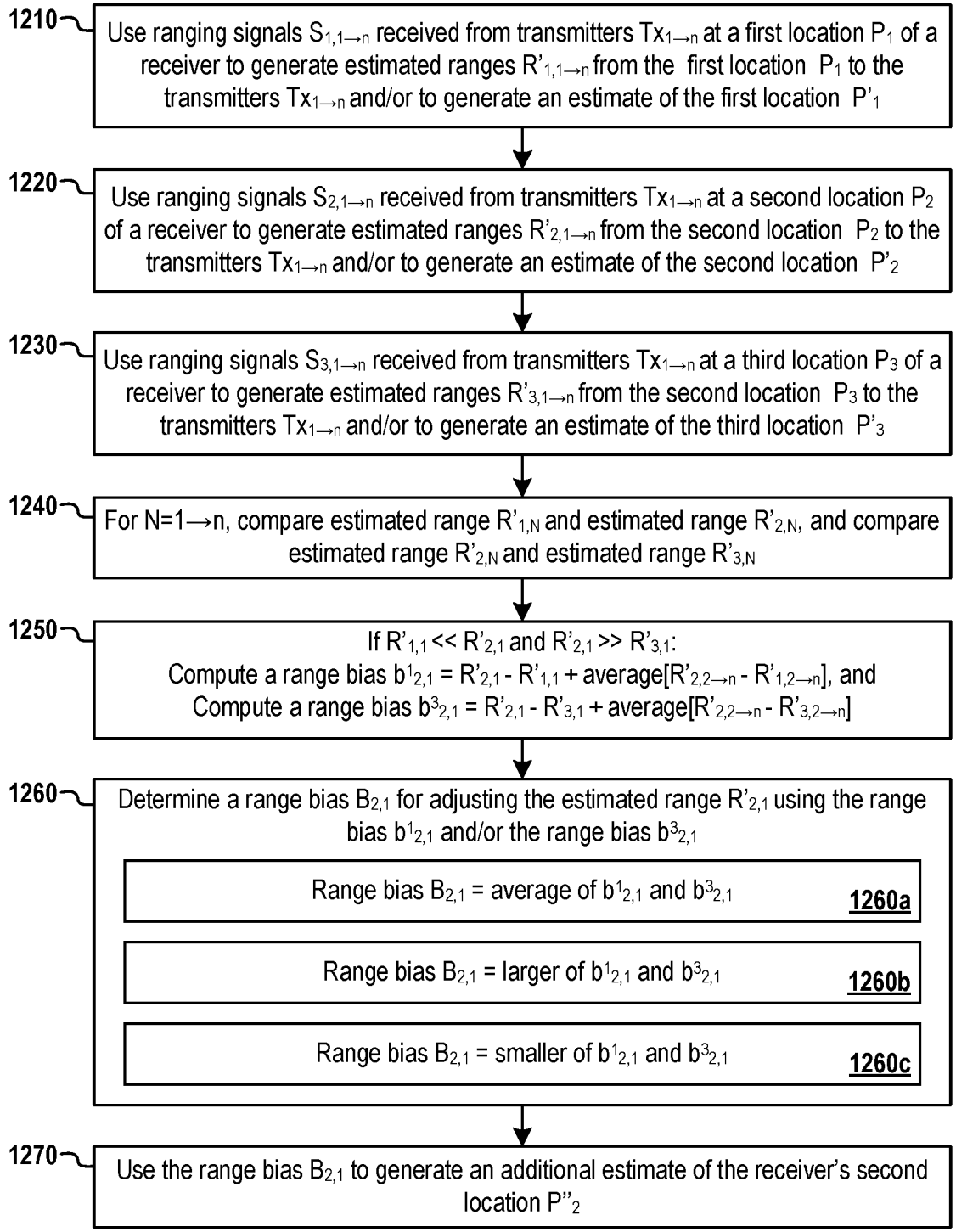
FIG. 12 illustrates a process for determining biases using estimated ranges for three locations of a receiver when a second relationship among corresponding range measurements for the different locations is detected.

FIG. 12 illustrates a process for determining biases using estimated ranges for three locations of a receiver when a second relationship among corresponding range measurements for the different locations is detected. The second relationship is when range measurements $R_{M,1}$ corresponding to signals received at positions $P_{M=1}$, $P_{M=2}$ and $P_{M=3}$ from a first transmitter $Tx_1$ have the following relationship $R'_{1,1} << R'_{2,1}$ and $R'_{2,1} >> R'_{3,1}$. The process illustrated in FIG. 12 includes the following steps: use ranging signals $S_{1,1 \rightarrow n}$ received from corresponding transmitters $Tx_{1 \rightarrow n}$ at a first location $P_1$ of a receiver to generate corresponding estimated ranges $R'_{1,1 \rightarrow n}$ from the first location $P_1$ to the corresponding transmitters $Tx_{1 \rightarrow n}$ and/or to generate an estimate of the first location $P'_1$ (step 1210); use ranging signals $S_{2,1 \rightarrow n}$ received from the corresponding transmitters $Tx_{1 \rightarrow n}$ at a second location $P_2$ of a receiver to generate corresponding estimated ranges $R'_{2,1 \rightarrow n}$ from the second location $P_2$ to the corresponding transmitters $Tx_{1 \rightarrow n}$ and/or to generate an estimate of the second location $P'_2$ (step 1220); use ranging signals $S_{3,1 \rightarrow n}$ received from the corresponding transmitters $Tx_{1 \rightarrow n}$ at a third location $P_3$ of a receiver to generate corresponding estimated ranges $R'_{3,1 \rightarrow n}$ from the second location $P_3$ to the transmitters $Tx_{1 \rightarrow n}$ and/or to generate an estimate of the third location $P'_3$ (step 1230); for N=1 to n, compare estimated range $R'_{1,N}$ and estimated range $R'_{2,N}$, and compare estimated range $R'_{2,N}$ and estimated range $R'_{3,N}$ (step 1240); compute range biases $b^1_{2,1}$ and $b^3_{2,1}$ (step 1250); determine a range bias $B_{2,1}$ for adjusting the estimated range $R'_{2,1}$ using the range bias $b^1_{2,1}$ and/or the range bias $b^3_{2,1}$ (step 1260); and use the range bias $B_{2,1}$ to generate an additional estimate of the receiver's second location $P'''_2$ (step 1270).

Step 1260 may include the following sub-steps: range bias $B_{2,1}$=average of $b^1_{2,1}$ and $b^3_{2,1}$ (sub-step 1260a); range bias $B_{2,1}$=larger of $b^1_{2,1}$ and $b^3_{2,1}$ (sub-step 1260b); and range bias $B_{2,1}$=smaller of $b^1_{2,1}$ and $b^3_{2,1}$ (sub-step 1260c).

In one embodiment, the range bias $b^1_{2,1}$ is computed by: computing, for each of N=2 to n, the difference between $R'_{2,N} - R'_{1,N}$, computing an average of the computed differences, and computing $b^1_{2,1} = R'_{2,1} - R'_{1,1} +$ the computed average.

In one embodiment, the range bias $b^3_{2,1}$ is computed by: computing, for each of N=2 to n, the difference between $R'_{2,N} - R'_{3,N}$, computing an average of the computed differences, and computing $b^3_{2,1} = R'_{2,1} - R'_{3,1} +$ the computed average.

In particular embodiments of FIG. 10, FIG. 11, and FIG. 12, where an additional estimate of the receiver's mth location $P'''_m$ is computed using a range bias $B_{m,n}$ to adjust an estimated range $R'_{m,n}$ between the mth location and the nth transmitter, $R'_{m,n}$ is adjusted by $B_{m,n}$ to produce an adjusted estimated range $R''_{m,n}$ (e.g., $R'_{m,n} - B_{m,n} = R''_{m,n}$), and $R''_{m,n}$ is used along with other estimated ranges or adjusted estimated ranges to generate the additional estimate of the receiver's mth location $P'''_m$ (e.g., using known techniques, such as trilateration).

Correcting Fixed Bias by Using Velocity Estimates

In addition to comparing static position estimates across devices, velocity observations (e.g., observed from a number of sources including Doppler shift and inertial sensors placed on a receiver) (e.g., direction and speed corresponding to motion) can be used to identify a less accurate range measurement from among two range measurements that correspond to estimates of two sequential positions. Once the less accurate range measurement is identified, a portion of the bias associated with the less accurate measurement can be estimated using the measured velocity and differences between the two observed range measurements.

Assume that the difference between two range measurements, $r'_{1,n}$ and $r'_{2,n}$ for two positions of a receiver has been observed (in terms of magnitude and/or direction). Also assume that the velocity, v, corresponding to movement between the two positions has been observed (in terms of magnitude and/or direction). The system can then compare each $r'_{1,n}$ and $r'_{2,n}$ with the following general logic (where consistent units of measurement are used): if $r'_{1,n} + v_n = r'_{2,n}$, the bias at the two positions from $Tx_N$ is the same; if $r'_{1,n} + v_n > r'_{2,n}$, then replace with $r'_{2,n} - v_n$, because the bias at $r'_{1,n}$ was observed to be greater than the bias at $r'_{2,n}$; and if $r'_{1,n} + v_n < r'_{2,n}$, then replace $r'_{2,n}$ with $r'_{1,n} + v_n$, because the bias at $r'_{2,n}$ was observed to be greater than the bias at $r'_{1,n}$. Thus, the velocity estimate can help create a bias estimate that is as good as the most-accurate range recorded at each of points 1 and 2. The bias estimate may not account for all bias, but can be used to scale down bias associated with one range measurement.

It is recognized that many approaches are available to detect that $r'_1$ has a larger relative bias relative to $r'_2$, or that $r'_2$ has a larger relative bias relative to $r'_1$, based on measured movement of the receiver. One approach involves computing a first measurement of difference in range between $r'_1$ and $r'_2$, (in terms of magnitude and direction), and then comparing the first measurement to a second measurement of distance associated with the measured velocity (in terms of magnitude and direction).

Another approach involves determining a first measurement corresponding to a combination of distance related to the measured velocity, and distance corresponding to $r'_1$, and then comparing the first measurement to a second measurement of distance corresponding to $r'_2$. Treatment of these comparisons are described above, and illustrations of these comparisons are provided in FIGS. 4A-D, which are described in more detail below.

Attention is drawn to two sets of figures—FIG. 4A and FIG. 4B, and FIG. 4C and FIG. 4D—where each set illustrates a different type of comparison between $r'_1$ and $r'_2$ from above. To simplify the examples, one range measurement is equal to the actual range between the receiver and the transmitter (Tx). The remaining range measurement has bias—e.g., the range measurement is extracted from a ranging signal that reflected off of a building. Each of the figure sets are provided for illustration in two dimensions. One of skill in the art will appreciate more complex scenarios and computations that extend the two-dimensional teachings to three dimensions. Such scenarios, while not necessarily illustrated in the figures, are contemplated.

Figure 4A:
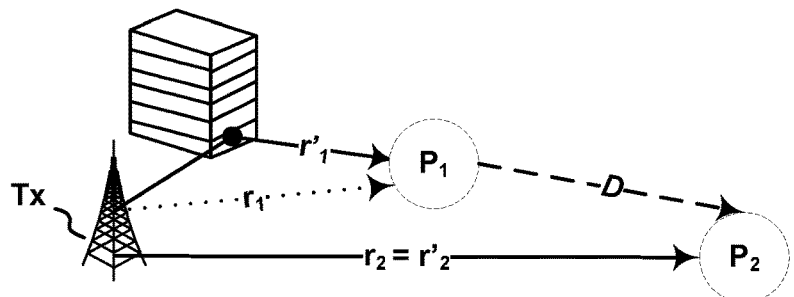
FIG. 4A and FIG. 4B illustrate a circumstance for using detected movement between two instances in time to identify a bias corresponding to a position of the receiver at one of the instances in time.
Figure 4B:
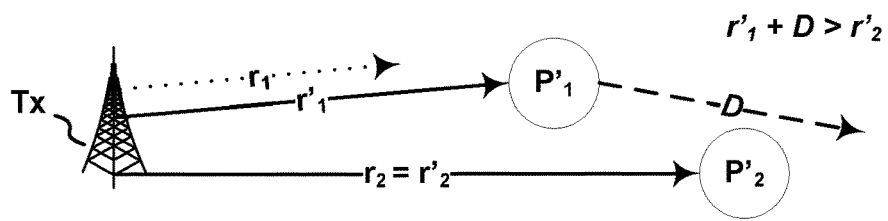

FIG. 4A and FIG. 4B illustrate the circumstance when the bias of $r'_1$ is observed to be greater than the bias for $r'_2$. As shown in FIG. 4A, $r'_1$ corresponds to a ranging signal from the transmitter (Tx) that arrives at a first position of the receiver ($P_1$) only after that signal reflects off of a building. FIG. 4A further illustrates a measured distance D, which refers to movement by a receiver from the first position ($P_1$) to a second position ($P_2$). By way of example, the distance D can be computed using a velocity estimate, v, (in terms of magnitude and/or direction) as would be known in the art.

FIG. 4B includes estimates of the first position and the second position, as designated by $P'_1$ and $P'_2$, respectively. The estimated position $P'_1$ is significantly more inaccurate than the estimated position $P'_2$ because the length of $r'_1$ extends far beyond $r_1$ (i.e., the actual range between Tx and $P_1$), and the length of length of $r'_2$ does not extend as far beyond $r_2$ (i.e., the actual range between Tx and $P_2$). In fact, $r'_2 = r_2$ for purposes of illustration. Alternatively, $r'_2 - r_2$ could be less than $r'_1 - r_1$. FIG. 4B further illustrates that the combination of $r'_1$ and D is greater than $r'_2$. Thus, a bias $B_1$ for $r'_1$ can be computed as $B_1 = r'_1 - (r'_2 - D)$, and can be stored in association with $r'_1$ and also in association with an estimate, $P'_1$, of the first position.

Figure 4C:
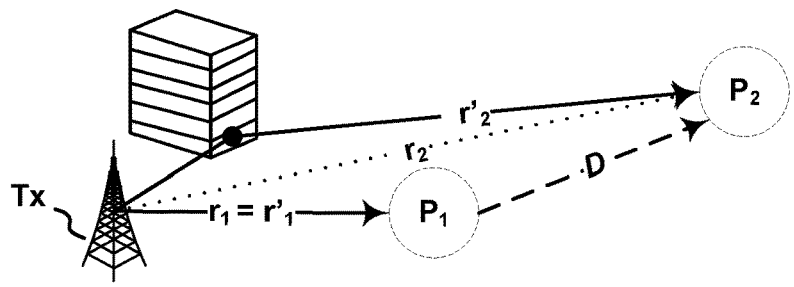
FIG. 4C and FIG. 4D illustrate another circumstance for using detected movement between two instances in time to identify a bias corresponding to a position of the receiver at one of the instances in time.
Figure 4D:
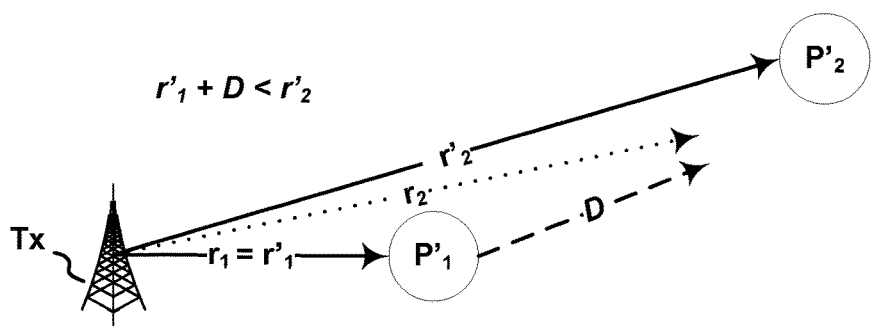

FIG. 4C and FIG. 4D illustrate the circumstance when the bias of $r'_2$ is observed to be greater than the bias for $r'_1$. As shown in FIG. 4C, $r'_2$ corresponds to a ranging signal from the transmitter (Tx) that arrives at a first position of the receiver ($P_2$) only after that signal reflects off of a building. FIG. 4C further illustrates a measured distance D, which refers to movement by a receiver from the first position ($P_1$) to a second position ($P_2$). By way of example, the distance D can be computed using a velocity estimate, v, (in terms of magnitude and/or direction) as would be known in the art.

FIG. 4D includes estimates of the first position and the second position, as designated by $P'_1$ and $P'_2$, respectively. The estimated position $P'_2$ is significantly more inaccurate than the estimated position $P'_1$ because the length of $r'_2$ extends far beyond $r_2$ (i.e., the actual range between Tx and $P_1$), and the length of length of $r'_1$ does not extend as far beyond the $r_1$ (i.e., the actual range between Tx and $P_2$). In fact, $r'_1 = r_1$ for purposes of illustration. Alternatively, $r'_1 - r_1$ could be less than $r'_2 - r_2$. FIG. 4D further illustrates that the combination of $r'_1$ and D is less than $r'_2$. Thus, a bias $B_2$ for $r'_2$ can be computed as $B_2 = r'_2 - (r'_1 + D)$, and can be stored in association with $r'_2$ and also in association with an estimate, $P'_2$, of the first position.

As illustrated above, biases can be estimated for an estimated range corresponding to an estimated position when a distance corresponding to movement of a receiver can be measured (e.g., a distance computed from a measured velocity using one or more inertial sensors). The examples in this and the next paragraph assume: a first estimated range measurement $r'_{1,n}$ computed using a ranging signal received from a transmitter $Tx_n$ at a first position $P_1$; a second estimated range measurement $r'_{2,n}$ computed using a ranging signal received from the transmitter $Tx_n$ at a second position $P_2$; and an estimated distance D traveled between first position $P_1$ and the second position $P_2$. If it is determined that $(r'_{1,n} + D_n)$ is greater than $r'_{2,n}$ (e.g., by itself, or in excess of a threshold amount of distance) then the bias $B_{1,n}$ for $r'_{1,n}$ in association with $P'_1$ may be computed as $r'_{1,n} - (r'_{2,n} - D_n)$ because the bias at $r'_{1,n}$ was observed to be greater than the bias at $r'_{2,n}$. If it is determined that $r'_2$ is greater than $(r'_{1,n} + D_n)$ (e.g., by itself, or in excess of a threshold amount of distance), then the bias $B_{2,n}$ for $r'_{2,n}$ in association with $P'_2$ may be computed as $r'_{2,n} - (r'_{1,n} + D_n)$ because the bias at $r'_{2,n}$ was observed to be greater than the bias at $r'_{1,n}$. Of course, the same results are achieved for alternative comparisons of $(r'_{2,n} - D_n)$ is less than $r'_{1,n}$, and $r'_{1,n}$ is less than $(r'_{2,n} - D_n)$, respectively.

As also illustrated above, the estimate for one position can be re-computed as the presence of biases are detected. For example, considering a transmitter $Tx_n$, if it is determined that $(r'_{1,n} + D_n)$ is greater than $r'_{2,n}$ (e.g., by itself, or in excess of a threshold amount of distance) then another estimate $P'''_1$ for the first position can be computed using $(r'_{2,n} - D_n)$ instead of $r'_{1,n}$; and if it is determined that $r'_2$ is greater than $(r'_{1,n} + D_n)$ (e.g., by itself, or in excess of a threshold amount of distance), then another estimate $P'''_2$ for the second position can be computed using $(r'_{1,n} + D_n)$ instead of $r'_{2,n}$. Of course, the same results are achieved for alternative comparisons of $(r'_{2,n} - D_n)$ is less than $r'_{1,n}$, and $r'_{1,n}$ is less than $(r'_{2,n} - D_n)$, respectively.

By way of example, the measurement of the distance D from above may be based on measured velocity (e.g., velocity multiplied by time of travel between the first and second positions). Of course, it is to be understood that a receiver's travel between two points may not be a straight line, and multiple velocities may be converted to corresponding distances d (in terms of magnitude and direction), and those corresponding distances d can be summed to compute the distance D (in terms of magnitude and direction).

Figure 5:
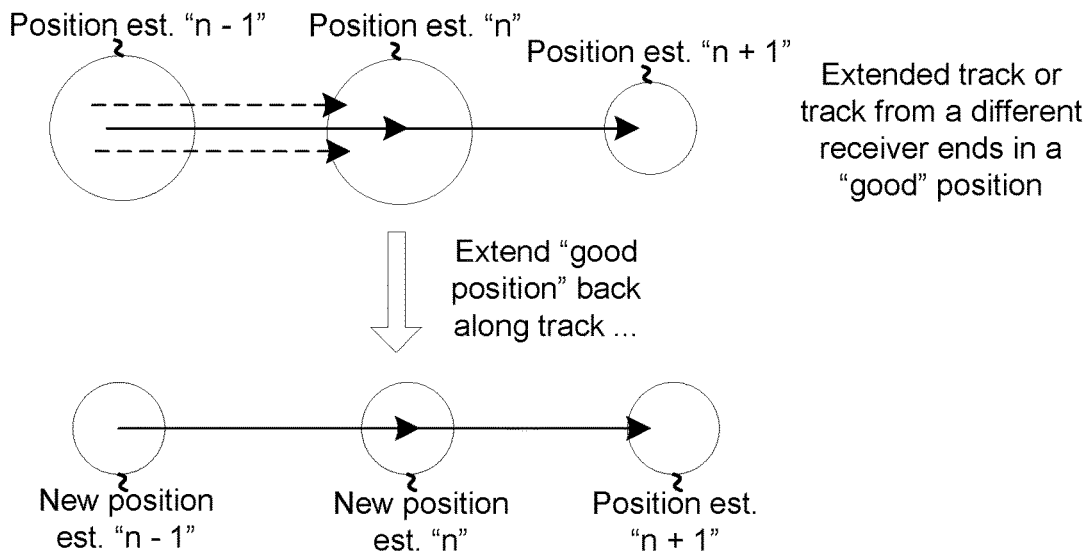
FIG. 5 pictorially illustrates methods for tracking receiver movement in order to identify inaccurate range measurements corresponding to one or more positions of the receiver during the movement.

It is contemplated that, over a longer track and over a larger number of points, estimates can be propagated through the system in a meaningful way. Consider positioning tracks illustrated in FIG. 5, which has consistent bias estimates for some number of position estimates n (e.g., the larger circles). At position n+1, one of the ranges is revealed to be too long (e.g., emerging from a building shadowing some number of transmitters). The good range estimate combined with the preceding range estimates and distance estimates (e.g., determined from a velocity estimates) can now provide a better bias estimate for every point along that positioning track before n+1, such that biases can be recorded for those points.

The following example in this paragraph assumes: a first estimated range measurement $r'_1$, computed using a ranging signal received from a transmitter $Tx_n$ at a first position $P_1$; a second estimated range measurement $r'_2$, computed using a ranging signal received from the transmitter $Tx_n$ at a second position $P_2$; a third estimated range measurement $r'_{3,n}$ computed using a ranging signal received from the transmitter $Tx_n$ at a third position $P_3$; and an estimated distance $D_{1\_2,n}$ traveled between first position $P_1$ and the second position $P_2$; and an estimated distance $D_{2\_3,n}$ traveled between first position $P_2$ and the second position $P_3$. If it is determined that $r'_{1,n}$ and $r'_{2,n}$ are within $D_{1\_2,n}$ from each other (optionally plus a threshold amount of distance), then the bias $B_{1,n}$ for $r'_{1,n}$ and the bias $B_{2,n}$ for $r'_{2,n}$ cannot be computed. However, if it is determined that $(r'_{2,n} + D_{2\_3,n})$ is greater than $r'_{3,n}$ (e.g., by itself, or in excess of a threshold amount of distance) then the bias $B_{2,n}$ for $r'_{2,n}$ may be computed as $r'_{2,n} - (r'_{3,n} - D_{2-3,n})$ because the bias at $r'_{2,n}$ was observed to be greater than the bias at $r'_{3,n}$. Once is $B_{2,n}$ is computed, it can be used to compute $B_{1,n}$ (e.g., $B_{1,n} = B_{2,n}$; $B_{1,n} = B_{2,n} - (r'_{2,n} - r'_{1,n})$; $B_{1,n} = B_{2,n} + (r'_{2,n} - r'_{1,n})$; or other computations described herein).

Further, by recording the tracks (e.g., points of position and movement in between the points), any future intersection with a given track's estimated biases will benefit from the earlier track's information. Suppose sample n+1 is not observed by the first receiver. Later, a second receiver with the same set of ranging data intersects that track and does observe sample n+1. This would permit position correction to be propagated both for the new set of range samples for the second receiver and the prior, recorded set for the first receiver. Recording a receiver's track may be useful such that knowledge of biases at one of the points can be used to determine biases of the other points based on the recorded movement. Thus, biases can be determined for ambiguous points.

In accordance with certain embodiments, features of the system include: transmitters at fixed locations; and an environment that is fixed over the measurement horizon used to create bias estimates. Stale bias estimates (e.g., old estimates) are more likely to be affected by environmental perturbations (e.g., building demolition, elevated roadway construction), although in a well-utilized system these estimates should not become generally stale. This information can be combined with the position comparison techniques described above to create a better bias estimate for each position estimate reported to the system.

Use of Inertial Sensors

Inertial measurement systems suffer from drift if not occasionally corrected, however over short time durations they tend to yield accurate results. Particularly in the case where the radio reference system is fixed, using an inertial solution to measure instantaneous velocity and comparing that with the observed velocity derived from the static position estimates and time, and Doppler estimates, could meaningfully improve the overall velocity estimate. Further, by using the inertial system only for transient measurements rather than tracking, which is referenced back to the fixed radio network, observed drift issues can be mitigated or eliminated. In certain embodiments, only inertial sensors are used for a short duration to determine an offset in the system, and then holding it static through reference to the fixed radio reference system. Thus, it is possible to identify error by integrating measurements of velocity over a short time horizon, using inertial sensors (e.g., magnetometers, accelerometers, gyros, and the like). In some cases, the inertial solution is of very short duration, constantly referenced against a fixed radio environment, and used in a feedback loop with the radio positioning and velocity estimates.

Measurement Uncertainty

In addition to fixed range biases, the reported ranges, r, for a given position are often "noisy" and could be better characterized as a histogram. These histograms will be "shifted" by the fixed range bias imparted by the environment in which the measurement is taken, and their dispersion can be attributed to both RF noise and the geometry of the system, among other properties. It is probable that these well-understood characteristics can also be exploited to improve the quality of positioning in the system.

One net effect on the preceding concepts includes characterization of any range as a distribution instead of a number, and using a database and server to compare range distributions instead of fixed ranges. The general concepts are unaffected. One implementation contemplates that measurements showing a large degree of variability can be discounted in the positioning calculation.

Example Methodologies

Methods of this disclosure may be implemented by hardware, firmware or software. One or more non-transitory machine-readable media embodying program instructions that, when executed by one or more machines, cause the one or more machines to perform or implement operations comprising the steps of any of the described methods are also contemplated. As used herein, machine-readable media includes all forms of statutory machine-readable media (e.g. statutory non-volatile or volatile storage media, statutory removable or non-removable media, statutory integrated circuit media, statutory magnetic storage media, statutory optical storage media, or any other statutory storage media). As used herein, machine-readable media does not include non-statutory media. By way of example, machines may include one or more computing device(s), processor(s), controller(s), integrated circuit(s), chip(s), system(s) on a chip, server(s), programmable logic device(s), other circuitry, and/or other suitable means described herein or otherwise known in the art.

Method steps described herein may be order independent, and can therefore be performed in an order different from that described. It is also noted that different method steps described herein can be combined to form any number of methods, as would be understood by one of skill in the art. It is further noted that any two or more steps described herein may be performed at the same time. Any method step or feature disclosed herein may be expressly restricted from a claim for various reasons like achieving reduced manufacturing costs, lower power consumption, and increased processing efficiency. Method steps performed by a transmitter or a receiver can be performed by a server, or vice versa.

By way of example, not by way of limitation, method(s) may comprise: determining a first set of range measurements using a first set of ranging signals received at a first position in a transmitter network; determining one or more range error adjustments that are associated with a second set of range measurements from a second set of signals received at a second position in the transmitter network; and estimating the first position using the first set of range measurements and the one or more range error adjustments that are associated with the second set of range measurements.

In accordance with some aspects, the one or more range error adjustments that are associated with the second set of range measurements are identified by: determining a first estimated position using the first set of range measurements; identifying a second estimated position, from among stored estimated positions, that is closest to the first estimate position, wherein the second estimated position is based on the second set of range measurements; and identifying the one or more range error adjustments after identifying the second estimated position.

In accordance with some aspects, the one or more range error adjustments that are associated with the second set of range measurements are identified by: identifying the second set of range measurements, from among stored sets of range measurements, based on a matching criterion; and identifying the one or more range error adjustments after identifying the second set of range measurements based on the matching criterion.

Method(s) may further or alternatively comprise: determining a first number of range measurements in the first set of range measurements that are within a threshold amount of distance from corresponding range measurements in the second set of range measurements; determining a second number of range measurements in the first set of range measurements that are within the threshold amount of distance from corresponding range measurements in another stored set of range measurements, wherein the second set of range measurements is selected over the other stored set of range measurements when the first number is greater than the second number.

In accordance with some aspects, the one or more range error adjustments that are associated with the second set of range measurements are identified by: selecting the second set of range measurements, from among stored sets of range measurements, when each of a first subset of n range measurements from the first set of range measurements and each of a second subset of n range measurements from the second set of range measurements are within a threshold amount of distance from each other; identifying a first range measurement in the first set of range measurements and a corresponding second range measurement in the second set of range measurements that are not within the threshold amount of distance from each other; and determining a first range error adjustment based on a relationship between the first range measurement and the second range measurement, wherein the one or more range error adjustments includes the first range error adjustment.

In accordance with some aspects, the first range error adjustment is determined based on (i) a measure of a difference between the first range measurement and the second range measurement, and (ii) measures of differences between each range measurement in the first subset of n range measurements and each corresponding range measurement in the second subset of n range measurements.

In accordance with some aspects, the first range error adjustment is determined based on a measure of a difference between (i) a mean of differences between each range measurement in the first subset of n range measurements and each corresponding range measurement in the second subset of n range measurements from (ii) a difference between the first range measurement and the second range measurement.

In accordance with some aspects, the first range error adjustment is determined by: determining whether the first range measurement is greater than or less than the second range measurement; and upon determining that the first range measurement is greater than the second range measurement, estimating the first position using the range measurements in the first subset of n range measurements, but without using the first range measurement.

In accordance with some aspects, the first range error adjustment is determined by: determining whether the first range measurement is greater than or less than the second range measurement, wherein based on determining that the first range measurement is less than the second range measurement, the first range error adjustment is set to zero.

In accordance with some aspects, the first subset of n range measurements includes a majority of the range measurements in the first set of range measurements.

In accordance with some aspects, the one or more range error adjustments include one or more range biases that correspond to the second set of range measurements.

In accordance with some aspects, the second and first positions correspond to positions of a receiver at different times.

Method(s) may further or alternatively comprise: estimating a velocity of the receiver between the second position and the first position; and determining, based on the estimated velocity, whether a first range measurement from the first set of range measurements is more or less accurate a second range measurement from the second set of range measurements.

In accordance with some aspects, the second range measurement is determined to be less accurate than the first range measurement when a measure of a difference between the first range measurement and the second range measurement is less than a measure of a distance that is based on the estimated velocity.

In accordance with some aspects, the first range measurement is determined to be less accurate than the second range measurement when a measure of a difference between the first range measurement and the second range measurement is greater than the measure of the distance that is based on the estimated velocity.

In accordance with some aspects, the second range measurement is stored.

Method(s) may further or alternatively comprise: storing the first range measurement in another set of stored range measurements; after determining that the second range measurement is less accurate than the first range measurement, replacing the stored second range measurement with a value corresponding to the first range measurement adjusted by a measure of a distance that is based on the estimated velocity; and after determining that the first range measurement is less accurate than the second range measurement, replacing the stored first range measurement with a value corresponding to the second range measurement adjusted by the measure of the distance that is based on the estimated velocity.

Any portion of the functionality embodied in the method(s) above may be combined with any other portion of that functionality.

For each process disclosed herein that performs a computation, at least one embodiment of that process includes steps for generating the terms of that computation (e.g., generation of sums, differences, means or averages, or other terms). It is noted that embodiments that compute a mean can be modified to compute an average, and embodiments that compute an average can be modified to compute a mean.

Systems that carry out functionality (e.g., embodied as methods) may include one or more devices, including transmitter(s) from which position information is sent, receiver(s) at which position information is received, processor(s)/server(s) used to compute a position of a receiver and carry out other functionality, input/output (I/O) device(s), data source(s) and/or other device(s). Outputs from a first device or group of devices may be received and used by another device during performance of methods. Accordingly, an output from one device may cause another device to perform a method even where the two devices are no co-located (e.g., a receiver in a network of transmitters and a server in another country). Additionally, one or more computers may be programmed to carry out various methods, and instructions stored on one or more processor-readable media may be executed by a processor to perform various methods.

Example Systems & Other Aspects

Figure 6:
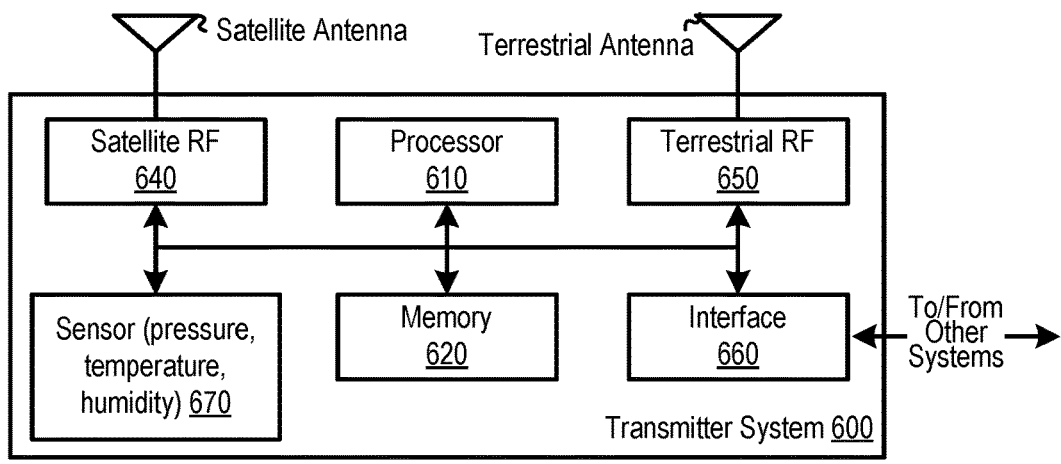
FIG. 6 depicts aspects of a transmitter system.

FIG. 6 illustrates details of transmitter system 600 at which signals may be generated and transmitted. Transmitter system 600 may include processor 610 that carries out signal processing (e.g., interpreting received signals and generating transmission signals). One or more memories 620 may provide storage and retrieval of data and/or executable instructions for performing functions described herein. Transmitter system 600 may further include one or more antenna components (e.g., satellite antenna or terrestrial antenna) for transmitting and receiving signals, satellite RF component 640 for receiving satellite signals, from which location information and/or other information (e.g., timing, dilution of precision (DOP), or other) may be extracted, terrestrial RF component 650 for receiving signals from a terrestrial network, and/or for generating and sending output signals, and interface 660 for communicating with other systems. Transmitter system 600 may also include one or more environmental sensors 670 for sensing environmental conditions (e.g., pressure, temperature, humidity, wind, sound, or other), which may be compared to such conditions as sensed at a receiver in order to estimate a position of the receiver based on similarities and differences between the conditions at transmitter system 600 and the receiver. It is noted that transmitter system 600 may be implemented by the transmitters described herein, which may alternatively take on other forms as known by one of skill in the art. Each transmitter system 600 may also include various elements as are known or developed in the art for providing output signals to, and receiving input signals from, the antennas, including analog or digital logic and power circuitry, signal processing circuitry, tuning circuitry, buffer and power amplifiers, and the like.

Figure 7:
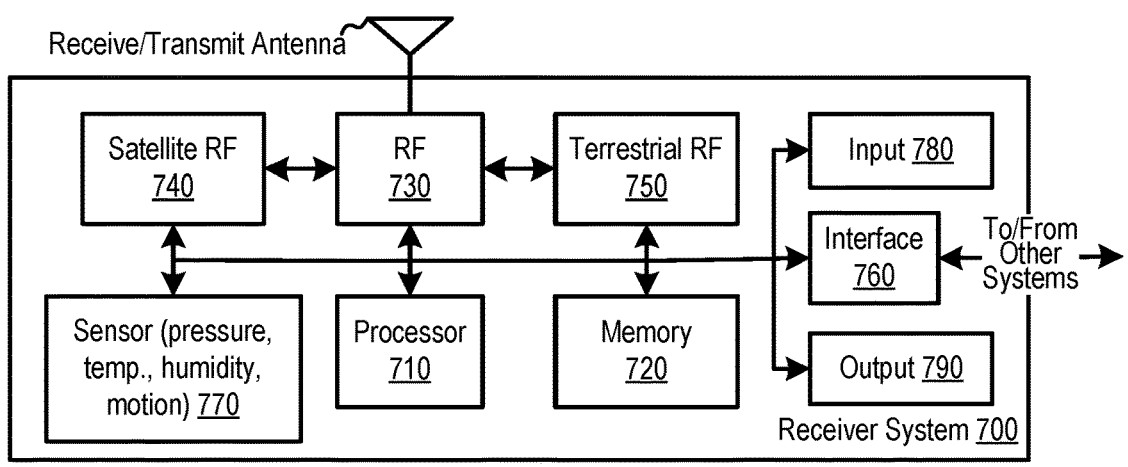
FIG. 7 depicts aspects of a receiver system.

FIG. 7 illustrates details of receiver system 700, at which signals from transmitters (e.g., transmitter system 600) may be received and processed to extract information used to compute an estimated position of receiver system 700. Receiver system 700 may include any of a variety of electronic devices configured to receive RF or other signaling using wireless means (radio frequency, Wi-Fi, Wi-Max, Bluetooth, or other wireless channels as is known or later developed in the art), or wired means (e.g., Ethernet, USB, flash RAM, or other similar channels as is known or later developed in the art). Each receiver system 700 may be in the form of a cellular or smart phone, a tablet device, a PDA, a notebook or other computing device. It is noted that User Equipment (UE), Mobile Station (MS), User Terminal (UT), SUPL Enabled Terminal (SET), Receiver (Rx), and Mobile Device may be used to refer to receiver system 700. As shown, RF component 730 may control the exchange of information with other systems (e.g., satellite, terrestrial). Signal processing may occur at satellite component 740 for receiving satellite signals, or terrestrial component 750, which may use separate or shared resources such as antennas, RF circuitry, and the like. One or more memories 720 may be coupled to a processor 710 to provide storage and retrieval of data and/or instructions relating to methodologies described herein that may be executed by processor 710. Receiver system 700 may further include one or more sensors 770 for measuring environmental conditions like pressure, temperature, humidity, acceleration, direction of travel, wind force, wind direction, sound, or other conditions. Receiver system 700 may further include input and output (I/O) components 780 and 790, which may include a keypad, touchscreen display, camera, microphone, speaker, or others, which may be controlled by means known in the art. It is noted that receiver system 700 may be implemented by the receivers described herein, which may alternatively take on other forms as known by one of skill.

In some embodiments, transmitter system 600 and/or receiver system 700 may be connected, via various wired or wireless communication link, to a server system (not shown), which may receive/send information from/to transmitter system 600 and/or receiver system 700. The server system may also control operations of transmitter system 600 and/or receiver system 700. Some or all processing that can be performed at transmitter system 600 and/or receiver system 700 may alternatively be performed by a one or more processors that are remote from those systems (e.g., in a different city, state, region, or country). Such remote processors may be located at the server system. Thus, processing may be geographically distributed. Processing in one system or component may be initiated by another system (e.g., upon receipt of signals or information from the other system.

Various techniques are used to estimate the position of an receiver, including trilateration, which is the process of using geometry to estimate a location of the receiver using distances (or "ranges") traveled by different "ranging" signals that are received by the receiver from different transmitters (or antennas when using a multi-antenna configuration). If the time of transmission of a ranging signal from a transmitter and the reception time of the ranging signal (e.g., time of arrival) are known, then the difference between those times multiplied by speed of light would provide an estimate of the distance traveled by that ranging signal. These estimates are often referred to as "range measurements". In most cases, the range measurements are not equal to the actual ranges (i.e., shortest distances) between transmitters 110 and the receiver 120, mainly because signals reflect off of objects (e.g., walls and other structures of buildings 190) that are disposed between or near the transmitters 110 and the receiver 120. Consequently, the estimate of the receiver's position does not necessarily overlap the actual position.

Discussion regarding comparisons of distance applies to comparisons of velocity. Similarly, the discussion applies to comparisons of values after each of those values have been modified by the same mathematical operation (e.g., value x multiplier, value$^2$, |value|, value converted to different units of measurement, or some other operation that produces a new value from the original value).

In addition to identifying bias corresponding to a measurement of range, aspects described elsewhere herein in relation detection of range biases may similarly apply to early peak detection, or detection of other characteristics of RF signals.

Systems comprising one or more modules that perform, are operable to perform, or adapted to perform different method steps/stages disclosed herein are also contemplated, where the modules are implemented using one or more machines listed herein or other suitable hardware. When two things (e.g., modules or other features) are "coupled to" each other, those two things may be directly connected together (e.g., shown by a line connecting the two things in the drawings), or separated by one or more intervening things. Where no lines and intervening things connect two particular things, coupling of those things is contemplated unless otherwise stated. Where an output of one thing and an input of another thing are coupled to each other, information (e.g., data and/or signaling) sent from the output is received by the input even if the data passes through one or more intermediate things. All information disclosed herein may be transmitted over any communication pathway using any protocol. Data, instructions, commands, information, signals, bits, symbols, and chips and the like may be represented by voltages, currents, electromagnetic waves, magnetic fields or particles, or optical fields or particles.

The various illustrative systems, methods, logical features, blocks, modules, components, circuits, and algorithm steps described herein may be implemented, performed, or otherwise controlled by suitable hardware known or later developed in the art, or by firmware or software executed by processor(s), or any such combination of hardware, software and firmware. Systems may include one or more devices or means that implement the functionality (e.g., embodied as methods) described herein. For example, such devices or means may include processor(s) that, when executing instructions, perform any of the methods disclosed herein. Such instructions can be embodied in software, firmware and/or hardware. A processor (also referred to as a "processing device") may perform or otherwise carry out any of the operational steps, processing steps, computational steps, method steps, or other functionality disclosed herein, including analysis, manipulation, conversion or creation of data, or other operations on data. A processor may include a general purpose processor, a digital signal processor (DSP), an integrated circuit, a server, other programmable logic device, or any combination thereof. A processor may be a conventional processor, microprocessor, controller, microcontroller, or state machine. A processor can also refer to a chip or part of a chip (e.g., semiconductor chip). The term "processor" may refer to one, two or more processors of the same or different types. It is noted that a computer, computing device and receiver, and the like, may refer to devices that include a processor, or may be equivalent to the processor itself.

A "memory" may accessible by a processor such that the processor can read information from and/or write information to the memory. Memory may be integral with or separate from the processor. Instructions may reside in such memory (e.g., RAM, flash, ROM, EPROM, EEPROM, registers, disk storage), or any other form of storage medium. Memory may include a non-transitory processor-readable medium having processor-readable program code (e.g., instructions) embodied therein that is adapted to be executed to implement the various methods disclosed herein. Processor-readable media be any available storage media, including non-volatile media (e.g., optical, magnetic, semiconductor) and carrier waves that transfer data and instructions through wireless, optical, or wired signaling media over a network using network transfer protocols. Instructions embodied in software can be downloaded to reside on and operated from different platforms used by known operating systems. Instructions embodied in firmware can be contained in an integrated circuit or other suitable device.

Functionality disclosed herein may be programmed into any of a variety of circuitry that is suitable for such purpose as understood by one of skill in the art. For example, functionality may be embodied in processors having software-based circuit emulation, discrete logic, custom devices, neural logic, quantum devices, PLDs, FPGA, PAL, ASIC, MOSFET, CMOS, ECL, polymer technologies, mixed analog and digital, and hybrids thereof. Data, instructions, commands, information, signals, bits, symbols, and chips disclosed herein may be represented by voltages, currents, electromagnetic waves, magnetic fields or particles, optical fields or particles, or any combination thereof. Computing networks may be used to carry out functionality and may include hardware components (servers, monitors, I/O, network connection). Application programs may carry out aspects by receiving, converting, processing, storing, retrieving, transferring and/or exporting data, which may be stored in a hierarchical, network, relational, non-relational, object-oriented, or other data source.

"Data" and "information" may be used interchangeably. A data source which is depicted as a single storage device may be realized by multiple (e.g., distributed) storage devices. A data source may include one or more types of data sources, including hierarchical, network, relational, non-relational, object-oriented, or another type of data source. As used herein, computer-readable media includes all forms of computer-readable medium except, to the extent that such media is deemed to be non-statutory (e.g., transitory propagating signals).

Features in system and apparatus figures that are illustrated as rectangles may refer to hardware, firmware or software. It is noted that lines linking two such features may be illustrative of data transfer between those features. Such transfer may occur directly between those features or through intermediate features even if not illustrated. Where no line connects two features, transfer of data between those features is contemplated unless otherwise stated. Accordingly, the lines are provide to illustrate certain aspects, but should not be interpreted as limiting. The words comprise, comprising, include, including and the like are to be construed in an inclusive sense (i.e., not limited to) as opposed to an exclusive sense (i.e., consisting only of). Words using the singular or plural number also include the plural or singular number, respectively. The word or and the word and, as used in the Detailed Description, cover any of the items and all of the items in a list. The words some, any and at least one refer to one or more. The term may is used herein to indicate an example, not a requirement—e.g., a thing that may perform an operation or may have a characteristic need not perform that operation or have that characteristic in each embodiment, but that thing performs that operation or has that characteristic in at least one embodiment.

The term "device" may comprise one or more components (e.g., a processor, a memory, a receiver, a screen, and others). The disclosure is not intended to be limited to the aspects shown herein but is to be accorded the widest scope understood by a skilled artisan, including equivalent systems and methods.

RELATED APPLICATIONS

This application relates to the following related application(s): U.S. patent application Ser. No. 14/207,400, filed Mar. 12, 2014, (U.S. Pub. No. US20140266910; published Sep. 18, 2014) entitled TECHNIQUES TO IMPROVE THE PERFORMANCE OF A FIXED, TIMING-BASED RADIO POSITIONING NETWORK USING EXTERNAL ASSISTANCE INFORMATION; and U.S. Pat. Appl. No. 61/789,951, filed Mar. 16, 2013, entitled TECHNIQUES TO IMPROVE THE PERFORMANCE OF A FIXED, TIMING-BASED RADIO POSITIONING NETWORK USING EXTERNAL ASSISTANCE INFORMATION. The content of each of the related application(s) is hereby incorporated by reference herein in its entirety.

The invention claimed is:

1. A method for determining one or more range biases, the method comprising:
   identifying a first range measurement computed using a first ranging signal received at a first position from a first terrestrial transmitter, wherein the first range measurement is an estimate of a range between the first position and the first terrestrial transmitter;
   identifying a second range measurement computed using a second ranging signal received at the first position from a second terrestrial transmitter, wherein the second range measurement is an estimate of a range between the first position and the second terrestrial transmitter;
   identifying a third range measurement computed using a third ranging signal received at the first position from a third terrestrial transmitter, wherein the third range measurement is an estimate of a range between the first position and the third terrestrial transmitter;
   identifying a fourth range measurement computed using a fourth ranging signal received at a second position from the first terrestrial transmitter, wherein the fourth range measurement is an estimate of a range between the second position and the first terrestrial transmitter;
   identifying a fifth range measurement computed using a fifth ranging signal received at the second position from the second terrestrial transmitter, wherein the fifth range measurement is an estimate of a range between the second position and the second terrestrial transmitter;
   identifying a sixth range measurement computed using a sixth ranging signal received at the second position from the third terrestrial transmitter, wherein the sixth range measurement is an estimate of a range between the second position and the third terrestrial transmitter;

determining that the first range measurement and the fourth range measurement are within a threshold amount of distance;

determining that the second range measurement and the fifth range measurement are within the threshold amount of distance;

determining if the third range measurement and the sixth range measurement are within the threshold amount of distance; and if a determination is made that the third range measurement and the sixth range measurement are not within the threshold amount of distance, computing a first bias estimate using the first, second, third, fourth, fifth and sixth range measurements;

determining, using a processor, an estimate of the second position using the first bias estimate.

2. The method of claim 1, the method comprising:
determining the estimate of the second position using the fourth range measurement, the fifth range measurement, the sixth range measurement, and the first bias estimate.

3. The method of claim 1, the method comprising:
determining an estimate of the first position using the first range measurement, the second range measurement, the third range measurement, and the first bias estimate.

4. The method of claim 1, the method comprising:
determining if the sixth range measurement exceeds the third range measurement by more than the threshold amount of distance, if a determination is made that the sixth range measurement exceeds the third range measurement by more than the threshold amount of distance, the first bias estimate is computed by:
  computing a first difference between the fourth range measurement and the first range measurement,
  computing a second difference between the fifth range measurement and the second range measurement,
  computing a third difference between the sixth range measurement and the third range measurement,
  computing an average using the first difference and the second difference, and
  computing a sum of the third difference and the computed average,
  wherein the first bias estimate is the sum.

5. The method of claim 4, the method comprising:
computing an adjusted sixth range measurement by subtracting the first bias estimate from the sixth range measurement; and
computing the estimate of the second position using the fourth range measurement, the fifth range measurement, and the adjusted sixth range measurement.

6. The method of claim 4, wherein the range between the first position and the third terrestrial transmitter, and the range between the second position and the third terrestrial transmitter, are unknown when computing the first bias estimate.

7. The method of claim 4, wherein the method comprises:
identifying a seventh range measurement computed using a seventh ranging signal received at a third position from the first terrestrial transmitter, wherein the seventh range measurement is an estimate of a range between the third position and the first terrestrial transmitter;
identifying an eighth range measurement computed using an eighth ranging signal received at the third position from the second terrestrial transmitter, wherein the eighth range measurement is an estimate of a range between the third position and the second terrestrial transmitter;
identifying a ninth range measurement computed using a ninth ranging signal received at the third position from the third terrestrial transmitter, wherein the ninth range measurement is an estimate of a range between the third position and the third terrestrial transmitter;
determining that the seventh range measurement and the fourth range measurement are within the threshold amount of distance;
determining that the eighth range measurement and the fifth range measurement are within the threshold amount of distance;
determining if the ninth range measurement and the sixth range measurement are within the threshold amount of distance; and
if a determination is made that the ninth range measurement and the sixth range measurement are within the threshold amount of distance:
  computing an adjusted ninth range measurement by subtracting the first bias estimate from the ninth range measurement; and
  computing an estimate of the third position using the seventh range measurement, the eighth range measurement, and the adjusted ninth range measurement.

8. The method of claim 4, wherein the method comprises:
identifying a seventh range measurement computed using a seventh ranging signal received at a third position from the first terrestrial transmitter, wherein the seventh range measurement is an estimate of a range between the third position and the first terrestrial transmitter;
identifying an eighth range measurement computed using an eighth ranging signal received at the third position from the second terrestrial transmitter, wherein the eighth range measurement is an estimate of a range between the third position and the second terrestrial transmitter;
identifying a ninth range measurement computed using a ninth ranging signal received at the third position from the third terrestrial transmitter, wherein the ninth range measurement is an estimate of a range between the third position and the third terrestrial transmitter;
determining that the seventh range measurement and the fourth range measurement are within the threshold amount of distance;
determining the eighth range measurement and the fifth range measurement are within the threshold amount of distance;
determining if the ninth range measurement exceeds the sixth range measurement by more than the threshold amount of distance; and
if a determination is made that the ninth range measurement exceeds the sixth range measurement by more than the threshold amount of distance, computing a second bias estimate by:
  computing a fourth difference between the seventh range measurement and the fourth range measurement,
  computing a fifth difference between the eighth range measurement and the fifth range measurement,
  computing a sixth difference between the ninth range measurement and the sixth range measurement,
  computing an additional average using the fourth difference and the fifth difference, and
  computing an additional sum of the sixth difference and the computed additional average, wherein the second bias estimate is the additional sum; and computing an adjusted ninth range measurement by subtracting the second bias estimate from the ninth range measurement; and computing an estimate of the third position using the seventh range measurement, the eighth range measurement, and the adjusted ninth range measurement.

9. The method of claim 4, wherein the method comprises:

identifying a seventh range measurement computed using a seventh ranging signal received at a third position from the first terrestrial transmitter, wherein the seventh range measurement is an estimate of a range between the third position and the first terrestrial transmitter;

identifying an eighth range measurement computed using an eighth ranging signal received at the third position from the second terrestrial transmitter, wherein the eighth range measurement is an estimate of a range between the third position and the second terrestrial transmitter;

identifying a ninth range measurement computed using a ninth ranging signal received at the third position from the third terrestrial transmitter, wherein the ninth range measurement is an estimate of a range between the third position and the third terrestrial transmitter;

determining that the seventh range measurement and the fourth range measurement are within the threshold amount of distance;

determining that the eighth range measurement and the fifth range measurement are within the threshold amount of distance;

determining if the ninth range measurement exceeds the sixth range measurement by more than the threshold amount of distance; and if a determination is made that the ninth range measurement exceeds the sixth range measurement by more than the threshold amount of distance, computing a second bias estimate by:

computing a fourth difference between the seventh range measurement and the fourth range measurement, computing a fifth difference between the eighth range measurement and the fifth range measurement, computing a sixth difference between the ninth range measurement and the sixth range measurement, computing an additional average using the fourth difference and the fifth difference, computing an additional sum of the sixth difference and the computed additional average, adjusting the additional sum by the first bias estimate, wherein the second bias estimate is the adjusted additional sum; and computing an adjusted ninth range measurement by subtracting the second bias estimate from the ninth range measurement; and computing an estimate of the third position using the seventh range measurement, the eighth range measurement, and the adjusted ninth range measurement.

10. The method of claim 4, wherein the method comprises:

identifying a seventh range measurement computed using a seventh ranging signal received at a third position from the first terrestrial transmitter, wherein the seventh range measurement is an estimate of a range between the third position and the first terrestrial transmitter;

identifying an eighth range measurement computed using an eighth ranging signal received at the third position from the second terrestrial transmitter, wherein the eighth range measurement is an estimate of a range between the third position and the second terrestrial transmitter;

identifying a ninth range measurement computed using a ninth ranging signal received at the third position from the third terrestrial transmitter, wherein the ninth range measurement is an estimate of a range between the third position and the third terrestrial transmitter;

determining that the seventh range measurement and the fourth range measurement are within the threshold amount of distance;

determining that the eighth range measurement and the fifth range measurement are within the threshold amount of distance;

determining if the sixth range measurement exceeds the ninth range measurement by more than the threshold amount of distance; and if a determination is made that the sixth range measurement exceeds the ninth range measurement by more than the threshold amount of distance, computing a second bias estimate by:

computing a fourth difference between the fourth range measurement and the seventh range measurement, computing a fifth difference between the fifth range measurement and the eighth range measurement, computing a sixth difference between the sixth range measurement and the ninth range measurement, computing an additional average using the fourth difference and the fifth difference, and computing an additional sum of the sixth difference and the computed additional average, wherein the second bias estimate is the additional sum.

11. The method of claim 10, the method comprising:

computing an average bias estimate using the first bias estimate and the second bias estimate;

computing an adjusted sixth range measurement by subtracting the average bias estimate from the sixth range measurement; and computing an estimate of the second position using the fourth range measurement, the fifth range measurement, and the adjusted sixth range measurement.

12. The method of claim 10, the method comprising:

determining if the first bias estimate is larger than the second bias estimate, or if the second bias estimate is larger than the first bias estimate;

computing an adjusted sixth range measurement by subtracting the first bias estimate from the sixth range measurement when the first bias estimate is larger than the second bias estimate, or computing an adjusted sixth range measurement by subtracting the second bias estimate from the sixth range measurement when the second bias estimate is larger than the first bias estimate; and computing an estimate of the second position using the fourth range measurement, the fifth range measurement, and the adjusted sixth range measurement.

13. The method of claim 10, the method comprising:

determining if the first bias estimate is smaller than the second bias estimate, or if the second bias estimate is smaller than the first bias estimate;

computing an adjusted sixth range measurement by subtracting the first bias estimate from the sixth range measurement when the first bias estimate is smaller than the second bias estimate, or computing an adjusted sixth range measurement by subtracting the second bias estimate from the sixth range measurement when the second bias estimate is smaller than the first bias estimate; and computing an estimate of the second position using the fourth range measurement, the fifth range measurement, and the adjusted sixth range measurement.

14. The method of claim 1, the method comprising:

determining if the third range measurement exceeds the sixth range measurement by more than the threshold amount of distance, if a determination is made that the third range measurement exceeds the sixth range measurement by more than the threshold amount of distance, the first bias estimate is computed by:
- computing a first difference between the first range measurement and the fourth range measurement,
- computing a second difference between the second range measurement and the fifth range measurement,
- computing a third difference between the third range measurement and the sixth range measurement,
- computing an average using the first difference and the second difference, and
- computing a sum of the third difference and the computed average, wherein the first bias estimate is the sum.

15. The method of claim 14, the method comprising:

computing an adjusted third range measurement by subtracting the first bias estimate from the third range measurement; and computing an estimate of the first position using the first range measurement, the second range measurement, and the adjusted third range measurement.

16. The method of claim 14, wherein the range between the first position and the third terrestrial transmitter, and the range between the second position and the third terrestrial transmitter, are unknown when computing the first bias estimate.

17. One or more non-transitory machine-readable media embodying program instructions that, when executed by one or more machines, cause the one or more machines to implement a method for determining one or more range biases, the method comprising:

identifying a first range measurement computed using a first ranging signal received at a first position from a first terrestrial transmitter, wherein the first range measurement is an estimate of a range between the first position and the first terrestrial transmitter;

identifying a second range measurement computed using a second ranging signal received at the first position from a second terrestrial transmitter, wherein the second range measurement is an estimate of a range between the first position and the second terrestrial transmitter;

identifying a third range measurement computed using a third ranging signal received at the first position from a third terrestrial transmitter, wherein the third range measurement is an estimate of a range between the first position and the third terrestrial transmitter;

identifying a fourth range measurement computed using a fourth ranging signal received at a second position from the first terrestrial transmitter, wherein the fourth range measurement is an estimate of a range between the second position and the first terrestrial transmitter;

identifying a fifth range measurement computed using a fifth ranging signal received at the second position from the second terrestrial transmitter, wherein the fifth range measurement is an estimate of a range between the second position and the second terrestrial transmitter;

identifying a sixth range measurement computed using a sixth ranging signal received at the second position from the third terrestrial transmitter, wherein the sixth range measurement is an estimate of a range between the second position and the third terrestrial transmitter;

determining that the first range measurement and the fourth range measurement are within a threshold amount of distance;

determining that the second range measurement and the fifth range measurement are within the threshold amount of distance;

determining if the third range measurement and the sixth range measurement are not within the threshold amount of distance; and if a determination is made that the third range measurement and the sixth range measurement are not within the threshold amount of distance, computing a first bias estimate using the first, second, third, fourth, fifth and sixth range measurements;

determining, using a processor, an estimate of the second position using the first bias estimate.

18. The one or more non-transitory machine-readable media of claim 17, the method comprising:

determining the estimate of the second position using the fourth range measurement, the fifth range measurement, the sixth range measurement, and the first bias estimate.

19. The one or more non-transitory machine-readable media of claim 17, the method comprising:

determining an estimate of the first position using the first range measurement, the second range measurement, the third range measurement, and the first bias estimate.

20. The one or more non-transitory machine-readable media of claim 17, the method comprising:

determining if the sixth range measurement exceeds the third range measurement by more than the threshold amount of distance, if a determination is made that the sixth range measurement exceeds the third range measurement by more than the threshold amount of distance, the first bias estimate is computed by:
- computing a first difference between the fourth range measurement and the first range measurement,
- computing a second difference between the fifth range measurement and the second range measurement,
- computing a third difference between the sixth range measurement and the third range measurement,
- computing an average using the first difference and the second difference, and
- computing a sum of the third difference and the computed average, wherein the first bias estimate is the sum.

21. The one or more non-transitory machine-readable media of claim 20, the method comprising:

computing an adjusted sixth range measurement by subtracting the first bias estimate from the sixth range measurement; and computing the estimate of the second position using the fourth range measurement, the fifth range measurement, and the adjusted sixth range measurement.

22. The one or more non-transitory machine-readable media of claim 20, wherein the range between the first position and the third terrestrial transmitter, and the range between the second position and the third terrestrial transmitter, are unknown when computing the first bias estimate.

23. The one or more non-transitory machine-readable media of claim 20, wherein the method comprises:
identifying a seventh range measurement computed using a seventh ranging signal received at a third position from the first terrestrial transmitter, wherein the seventh range measurement is an estimate of a range between the third position and the first terrestrial transmitter;
identifying an eighth range measurement computed using an eighth ranging signal received at the third position from the second terrestrial transmitter, wherein the eighth range measurement is an estimate of a range between the third position and the second terrestrial transmitter;
identifying a ninth range measurement computed using a ninth ranging signal received at the third position from the third terrestrial transmitter, wherein the ninth range measurement is an estimate of a range between the third position and the third terrestrial transmitter;
determining that the seventh range measurement and the fourth range measurement are within the threshold amount of distance;
determining that the eighth range measurement and the fifth range measurement are within the threshold amount of distance;
determining if the ninth range measurement and the sixth range measurement are within the threshold amount of distance; and
if a determination is made that the ninth range measurement and the sixth range measurement are within the threshold amount of distance:
computing an adjusted ninth range measurement by subtracting the first bias estimate from the ninth range measurement; and
computing an estimate of the third position using the seventh range measurement, the eighth range measurement, and the adjusted ninth range measurement.

24. The one or more non-transitory machine-readable media of claim 20, wherein the method comprises:
identifying a seventh range measurement computed using a seventh ranging signal received at a third position from the first terrestrial transmitter, wherein the seventh range measurement is an estimate of a range between the third position and the first terrestrial transmitter;
identifying an eighth range measurement computed using an eighth ranging signal received at the third position from the second terrestrial transmitter, wherein the eighth range measurement is an estimate of a range between the third position and the second terrestrial transmitter;
identifying a ninth range measurement computed using a ninth ranging signal received at the third position from the third terrestrial transmitter, wherein the ninth range measurement is an estimate of a range between the third position and the third terrestrial transmitter;
determining that the seventh range measurement and the fourth range measurement are within the threshold amount of distance;
determining that the eighth range measurement and the fifth range measurement are within the threshold amount of distance;
determining if the ninth range measurement exceeds the sixth range measurement by more than the threshold amount of distance; and
if a determination is made that the ninth range measurement exceeds the sixth range measurement by more than the threshold amount of distance, computing a second bias estimate by:
computing a fourth difference between the seventh range measurement and the fourth range measurement,
computing a fifth difference between the eighth range measurement and the fifth range measurement,
computing a sixth difference between the ninth range measurement and the sixth range measurement,
computing an additional average using the fourth difference and the fifth difference, and
computing an additional sum of the sixth difference and the computed additional average,
wherein the second bias estimate is the additional sum; and
computing an adjusted ninth range measurement by subtracting the second bias estimate from the ninth range measurement; and
computing an estimate of the third position using the seventh range measurement, the eighth range measurement, and the adjusted ninth range measurement.

25. The one or more non-transitory machine-readable media of claim 20, wherein the method comprises:
identifying a seventh range measurement computed using a seventh ranging signal received at a third position from the first terrestrial transmitter, wherein the seventh range measurement is an estimate of a range between the third position and the first terrestrial transmitter;
identifying an eighth range measurement computed using an eighth ranging signal received at the third position from the second terrestrial transmitter, wherein the eighth range measurement is an estimate of a range between the third position and the second terrestrial transmitter;
identifying a ninth range measurement computed using a ninth ranging signal received at the third position from the third terrestrial transmitter, wherein the ninth range measurement is an estimate of a range between the third position and the third terrestrial transmitter;
determining that the seventh range measurement and the fourth range measurement are within the threshold amount of distance;
determining that the eighth range measurement and the fifth range measurement are within the threshold amount of distance;
determining if the ninth range measurement exceeds the sixth range measurement by more than the threshold amount of distance; and
if a determination is made that the ninth range measurement exceeds the sixth range measurement by more than the threshold amount of distance, computing a second bias estimate by:
computing a fourth difference between the seventh range measurement and the fourth range measurement,
computing a fifth difference between the eighth range measurement and the fifth range measurement,
computing a sixth difference between the ninth range measurement and the sixth range measurement,
computing an additional average using the fourth difference and the fifth difference,
computing an additional sum of the sixth difference and the computed additional average,
adjusting the additional sum by the first bias estimate, wherein the second bias estimate is the adjusted additional sum; and computing an adjusted ninth range measurement by subtracting the second bias estimate from the ninth range measurement; and computing an estimate of the third position using the seventh range measurement, the eighth range measurement, and the adjusted ninth range measurement.

26. The one or more non-transitory machine-readable media of claim 20, wherein the method comprises:

identifying a seventh range measurement computed using a seventh ranging signal received at a third position from the first terrestrial transmitter, wherein the seventh range measurement is an estimate of a range between the third position and the first terrestrial transmitter;

identifying an eighth range measurement computed using an eighth ranging signal received at the third position from the second terrestrial transmitter, wherein the eighth range measurement is an estimate of a range between the third position and the second terrestrial transmitter;

identifying a ninth range measurement computed using a ninth ranging signal received at the third position from the third terrestrial transmitter, wherein the ninth range measurement is an estimate of a range between the third position and the third terrestrial transmitter;

determining that the seventh range measurement and the fourth range measurement are within the threshold amount of distance;

determining that the eighth range measurement and the fifth range measurement are within the threshold amount of distance;

determining if the sixth range measurement exceeds the ninth range measurement by more than the threshold amount of distance; and if a determination is made that the sixth range measurement exceeds the ninth range measurement by more than the threshold amount of distance, computing a second bias estimate by:

computing a fourth difference between the fourth range measurement and the seventh range measurement, computing a fifth difference between the fifth range measurement and the eighth range measurement, computing a sixth difference between the sixth range measurement and the ninth range measurement, computing an additonal average using the fourth difference and the fifth difference, and computing an additional sum of the sixth difference and the computed additional average, wherein the second bias estimate is the additional sum.

27. The one or more non-transitory machine-readable media of claim 26, the method comprising:

computing an average bias estimate using the first bias estimate and the second bias estimate;

computing an adjusted sixth range measurement by subtracting the average bias estimate from the sixth range measurement; and computing an estimate of the second position using the fourth range measurement, the fifth range measurement, and the adjusted sixth range measurement.

28. The one or more non-transitory machine-readable media of claim 26, the method comprising:

determining if the first bias estimate is larger than the second bias estimate, or if the second bias estimate is larger than the first bias estimate;

computing an adjusted sixth range measurement by subtracting the first bias estimate from the sixth range measurement when the first bias estimate is larger than the second bias estimate, or computing an adjusted sixth range measurement by subtracting the second bias estimate from the sixth range measurement when the second bias estimate is larger than the first bias estimate; and computing an estimate of the second position using the fourth range measurement, the fifth range measurement, and the adjusted sixth range measurement.

29. The one or more non-transitory machine-readable media of claim 26, the method comprising:

determining if the first bias estimate is smaller than the second bias estimate, or if the second bias estimate is smaller than the first bias estimate;

computing an adjusted sixth range measurement by subtracting the first bias estimate from the sixth range measurement when the first bias estimate is smaller than the second bias estimate, or computing an adjusted sixth range measurement by subtracting the second bias estimate from the sixth range measurement when the second bias estimate is smaller than the first bias estimate; and computing an estimate of the second position using the fourth range measurement, the fifth range measurement, and the adjusted sixth range measurement.

30. The one or more non-transitory machine-readable media of claim 17, the method comprising:

determining if the third range measurement exceeds the sixth range measurement by more than the threshold amount of distance, if a determination is made that the third range measurement exceeds the sixth range measurement by more than the threshold amount of distance, the first bias estimate is computed by:

computing a first difference between the first range measurement and the fourth range measurement, computing a second difference between the second range measurement and the fifth range measurement, computing a third difference between the third range measurement and the sixth range measurement, computing an average using the first difference and the second difference, and computing a sum of the third difference and the computed average, wherein the first bias estimate is the sum.

31. The one or more non-transitory machine-readable media of claim 30, the method comprising:

computing an adjusted third range measurement by subtracting the first bias estimate from the third range measurement; and computing an estimate of the first position using the first range measurement, the second range measurement, and the adjusted third range measurement.

32. The one or more non-transitory machine-readable media of claim 30, wherein the range between the first position and the third terrestrial transmitter, and the range between the second position and the third terrestrial transmitter, are unknown when computing the first bias estimate.

* * * * *